US012748073B2

(12) United States Patent
Hollerbach et al.

(10) Patent No.: US 12,748,073 B2
(45) Date of Patent: Sep. 29, 2026

(54) WAVEFORMS IN AN ION MOBILITY SPECTROMETER

(71) Applicant: Battelle Memorial Institute, Richland, WA (US)

(72) Inventors: Adam L. Hollerbach, Richland, WA (US); Yehia M. Ibrahim, West Richland, WA (US); Richard D. Smith, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 341 days.

(21) Appl. No.: 18/514,816

(22) Filed: Nov. 20, 2023

(65) Prior Publication Data

US 2024/0361274 A1 Oct. 31, 2024

Related U.S. Application Data

(60) Provisional application No. 63/462,725, filed on Apr. 28, 2023.

(51) Int. Cl.

| | |
|---|---|
| ***G01N 27/623*** | (2021.01) |
| ***H01J 49/00*** | (2006.01) |
| ***H01J 49/40*** | (2006.01) |

(52) U.S. Cl.

CPC ........ *G01N 27/623* (2021.01); *H01J 49/0031* (2013.01); *H01J 49/40* (2013.01)

(58) Field of Classification Search

CPC ..... G01N 27/623; H01J 49/40; H01J 49/0031

See application file for complete search history.

(56) References Cited

U.S. PATENT DOCUMENTS

| | | | | |
|---|---|---|---|---|
| 8,835,839 B1 * | 9/2014 | Anderson | ............. | H01J 49/062 250/290 |
| 10,018,592 B2 | 7/2018 | Ibrahim et al. | | |
| 10,460,920 B1 * | 10/2019 | Smith | .................. | H01J 49/063 |

(Continued)

OTHER PUBLICATIONS

Deng et al., "Compression Ratio Ion Mobility Programming (CRIMP) Accumulation and Compression of Billions of Ions for Ion Mobility-Mass Spectrometry Using Traveling Waves in Structures for Lossless Ion Manipulations (SLIM)," Author Manuscript, pp. 1-16 and 5 supplementary pages, also published as Deng et al., "Compression Ratio Ion Mobility Programming (CRIMP) Accumulation and Compression of Billions of Ions for Ion Mobility-Mass Spectrometry Using Traveling Waves in Structures for Lossless Ion Manipulations (SLIM)," *Analytical Chemistry*, vol. 89, Article 12 (May 2017).

(Continued)

*Primary Examiner* — Sean Luck

(74) *Attorney, Agent, or Firm* — Klarquist Sparkman, LLP

(57) ABSTRACT

Apparatus and methods are disclosed to improve performance of ion mobility separation. Deleterious bend effects are counteracted by adjusting phase shifts between adjoining traveling wave sections at bends; superior trajectories and performance are achieved. Improvements are also achieved by arranging serpentine paths primarily along a lengthwise direction of a substrate, thereby reducing the number of bends. An ion mobility spectrometers is coupled to a mass spectrometer, and intermittent traveling waves improve sample utilization or reduce total time required for combined ion analysis with both modalities.

19 Claims, 13 Drawing Sheets

(56) References Cited

U.S. PATENT DOCUMENTS

| | | | | |
|---|---|---|---|---|
| 10,720,315 | B2 | 7/2020 | Taghioskoui | |
| 10,840,077 | B2 | 11/2020 | Taghioskoui | |
| 11,219,393 | B2 | 1/2022 | Taghioskoui | |
| 11,222,776 | B1 | 1/2022 | Taghioskoui | |
| 11,756,779 | B2 | 9/2023 | Taghioskoui | |
| 12,080,539 | B2 | 9/2024 | Taghioskoui | |
| 12,089,932 | B2 | 9/2024 | Taghioskoui | |
| 12,354,861 | B1 | 7/2025 | Taghioskoui | |
| 12,376,770 | B2 | 8/2025 | Taghioskoui | |
| 12,376,771 | B2 | 8/2025 | Taghioskoui | |
| 12,381,073 | B1 | 8/2025 | Taghioskoui | |
| 2017/0076931 | A1* | 3/2017 | Ibrahim | H01J 49/40 |
| 2018/0038831 | A1* | 2/2018 | Ibrahim | H01J 49/425 |
| 2019/0103261 | A1 | 4/2019 | Ibrahim et al. | |
| 2019/0369050 | A1 | 12/2019 | Garimella et al. | |
| 2020/0378922 | A1 | 12/2020 | Ibrahim et al. | |
| 2021/0351003 | A1 | 11/2021 | Garimella et al. | |

OTHER PUBLICATIONS

Deng et al., "Integration of a high duty cycle SLIM mobility filter with a triple quadrupole mass spectrometer for targeted quantitative analysis," with Supplementary Information, *International Journal of Mass Spectrometry*, vol. 475, No. 116832, pp. 1-11, S1-S11 (Mar. 2022).

Deng et al., "Initial Experiments on Increasing Sensitivity of Orbitrap Mass Spectrometry using Structures for Lossless Ion Manipulation," Human Proteome World Congress (HUPO), 1 page (Dec. 2022).

Dodds et al., "Ion Mobility Spectrometry: Fundamental Concepts, Instrumentation, Applications, and the Road Ahead," Author Manuscript, pp. 1-21, also published as Dodds et al., "Ion Mobility Spectrometry: Fundamental Concepts, Instrumentation, Applications, and the Road Ahead," *Journal of the American Society for Mass Spectrometry*, vol. 30, No. 11, pp. 2185-2195 (Sep. 2019).

Eliuk et al., "Evolution of Orbitrap Mass Spectrometry Instrumentation," *Annual Review of Analytical Chemistry*, vol. 8, pp. 61-80 (Jul. 2015).

Hollerbach et al., "A Dual-Gated SLIM-Orbitrap Platform for Simultaneously Acquiring HR-IMS-MS/MS," *71st Conference on Mass Spectrometry and Allied Topics, American Society for Mass Spectrometry*, 1 page (Jun. 2023).

Hollerbach et al., "A Dual-Gated Structures for Lossless Ion Manipulations-Ion Mobility Orbitrap Mass Spectrometry Platform for Combined Ultra-High-Resolution Molecular Analysis," *Analytical Chemistry*, vol. 95, pp. 9531-9538, S1-S25 (Jun. 2023).

International Search Report and Written Opinion dated Sep. 17, 2024, from International Patent Application No. PCT/US2024/020375, 20 pages.

* cited by examiner

WAVEFORMS IN AN ION MOBILITY SPECTROMETER

CROSS REFERENCE TO RELATED APPLICATIONS

This application claims the benefit of U.S. Provisional Patent Application No. 63/462,725, filed on Apr. 28, 2023, which application is incorporated herein by reference in entirety.

ACKNOWLEDGMENT OF GOVERNMENT SUPPORT

This invention was made with government support under contract DE-AC05-76RL01830 awarded by the United States Department of Energy. Additional support was also provided by NIH grant P41 GM103493-15. The government has certain rights in the invention.

FIELD

The field is ion manipulation devices.

BACKGROUND

Ion mobility (IM) spectrometry is a gas phase separation technique that continues to gain popularity due to its ability to distinguish between ions of different shapes, its improved dynamic range, and its speed compared to liquid phase techniques. Because the resolution in IM spectrometry depends on the time ions spend interacting with the electric field and colliding with buffer gas, one way to increase the time is by increasing the length of the separation channel. The resolution is ideally dependent on the square-root of the separation channel length, and greater lengths are often desirable to separate species of interest. To accommodate greatly extended lengths, separation channels have been folded into serpentine paths (most notably using electrical traveling waves). For some applications, IM spectrometry can also be combined with a downstream instrument such as a mass spectrometer (MS). As system complexities increase, there remains a need for improved technologies for maintaining or improving performance of IM systems over long path lengths and improving coupling with a downstream analyzer.

SUMMARY

In one aspect, examples of the disclosed technologies modify treatment of bends in long ion transport channels to improve performance of traveling wave based IM separations. In some examples, phase shift of the traveling waves between adjoining segments, at the intersection of two paths to implement a turn in direction or two such changes in immediate proximity to make a "U-turn" bend for reversal of direction, can be adjusted to improve properties associated with ion transport and the resulting separation. In further examples, serpentine layouts can be modified to reduce the total number of bends in a planar transport channel, thereby also improving properties associated with ion transport. Exemplary properties that can be improved or optimized through such techniques include transit time, width of a transit time distribution, resolving power, or ion loss.

In another aspect, examples of the disclosed technologies operate an IM separation subsystem in two modes. In an active mode, ions can be driven through an ion transport channel by applying traveling wave excitation to a set of electrodes, causing ions to separate according to their respective mobilities and, after a time, discharging packets of ions at an outlet of the subsystem. In a passive mode, electrode excitations can be slowed down or stopped, to maintain ion separation achieved thus far and conserve ions within the subsystem. Particularly, a downstream mass spectrometer may only be able to receive ion packets periodically, there being some time required to perform a high resolution analysis of a previous ion packet. Conserving ions within the IM separation subsystem can avoid wasting ions and, in some situations, can also speed up overall time of a dual-modality sample analysis.

These aspects can be combined. For example, an intermittent traveling wave analyzer can employ optimized relative phases at bends in an ion transport channel to achieve improved transport properties.

The foregoing and other objects, features, and advantages of the disclosed technologies will become more apparent from the following detailed description, which proceeds with reference to the accompanying figures.

DETAILED DESCRIPTION

Introduction

Ion mobility (IM) spectrometry is an analytical separation technique that separates ions based on their size and electrical charge. This information is helpful for determining the structure of an ion, and the technique is being increasingly employed in analytical laboratories. High resolution IM spectrometry is particularly useful since it can help differentiate between ions with extremely similar sizes and charges, such as those found in biological samples. Currently, the highest resolution IM separation systems have been developed at Pacific Northwest National Laboratory (PNNL) and are named structures for lossless ion manipulations (SLIMs). SLIMs have provided researchers with the ability to explore new insights into chemical composition and chemical behavior in biological systems. However, SLIM systems are constantly being improved to obtain ever higher IM separation resolution.

1. Reducing Number of Bends

Resolution in a SLIM can be improved by designing an ion transport channel as a serpentine path that compacts a long path length into a small footprint. Often, a SLIM uses 90° turns (single, or two in series to make a U-turn) to move ions around serpentine paths. This can provide very long ion path lengths in a relatively small area. While these turns have allowed SLIMs to achieve ultra-high resolution IM separation, recent research has indicated that SLIM with many U-turns can sometimes produce lower resolutions than SLIM with the same path length but without U-turns. That is, each U-turn can introduce a small reduction in resolving power that progressively worsens as the number of U-turns increases.

In experiments, a 1 m long miniature SLIM possessing with 26 turns and 2 ion escalators produced resolution comparable to a 78 cm straight path length SLIM. This result was surprising because the 1 m SLIM had been expected to have better resolution than the 78 cm SLIM, other conditions being equal (e.g., pressure, buffer gas composition, electric field strength, ions analyzed). A significant difference between these two systems was that the miniature SLIM employed twenty-six turns while the straight SLIM had no turns. Ion trajectory simulations have also indicated that broadening of a peak (e.g. in a distribution of ion transit times) can occur at each SLIM turn.

Accordingly, it can be desirable to reduce the number of bends in an ion transport path to achieve the same (or better) separation power as straight path SLIM. Particularly, reducing a number of bends can mitigate peak broadening and loss of resolution. This can be accomplished by making most of the SLIM path span a substrate (e.g. a printed wiring board) in lengthwise segments, thereby achieving fewer turns compared with having width-wise segments as has been commonly practiced. Compare, for example, FIG. 10 with FIG. 9.

Figure 10:
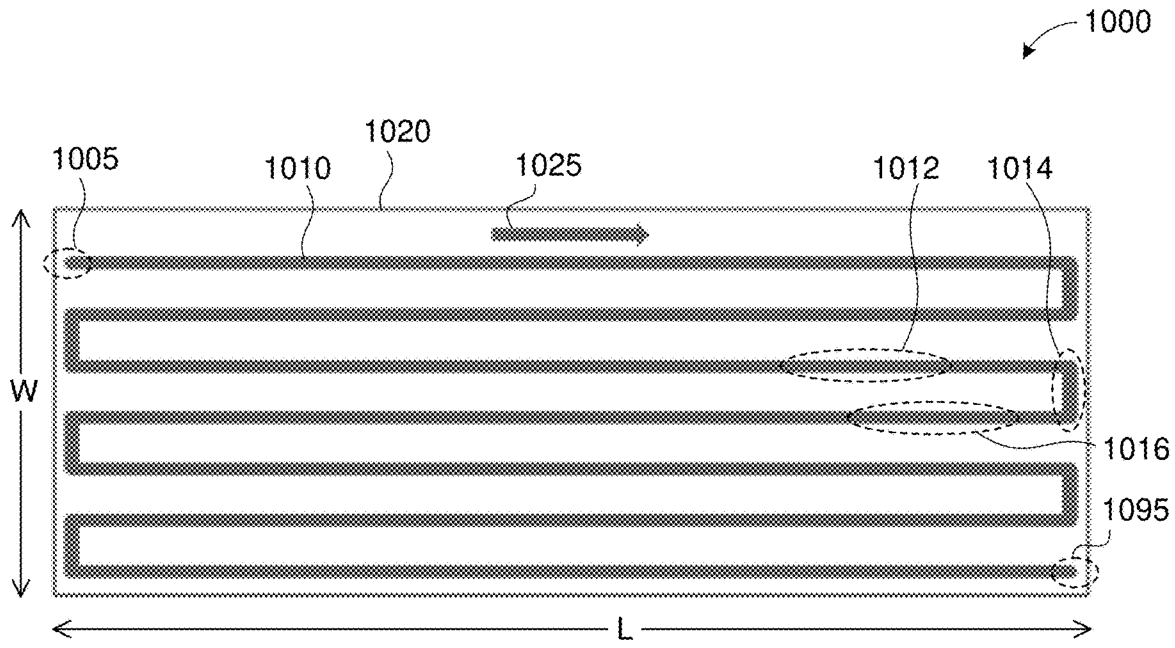
FIG. 10 is a plan view of an example layout of a serpentine ion transport channel according to the disclosed technologies.

To validate this technique, a new SLIM system was developed, with longer ion path segments oriented lengthwise along the surface (similar to FIG. 10). The new SLIM possessed forty-eight 90° turns, which is approximately half the number of turns used in earlier SLIM designs, while maintaining comparable total ion path length of approximately 11 m. The new SLIM was used to separate a mixture of two singly charged reverse peptides ($SDGRG^{1+}$, $GRGDS^{1+}$). The highest peak-peak resolution obtained with the new SLIM system using these compounds was ~2.8, and the highest calculated resolving power was ~600. These numbers are approximately 1.5× higher (better) than those obtained an older SLIM system having similar path lengths but twice the number of turns. This is a significant improvement achievable with a simple alteration to a SLIM design.

2. Optimized Phasing at Bends

Figure 11:
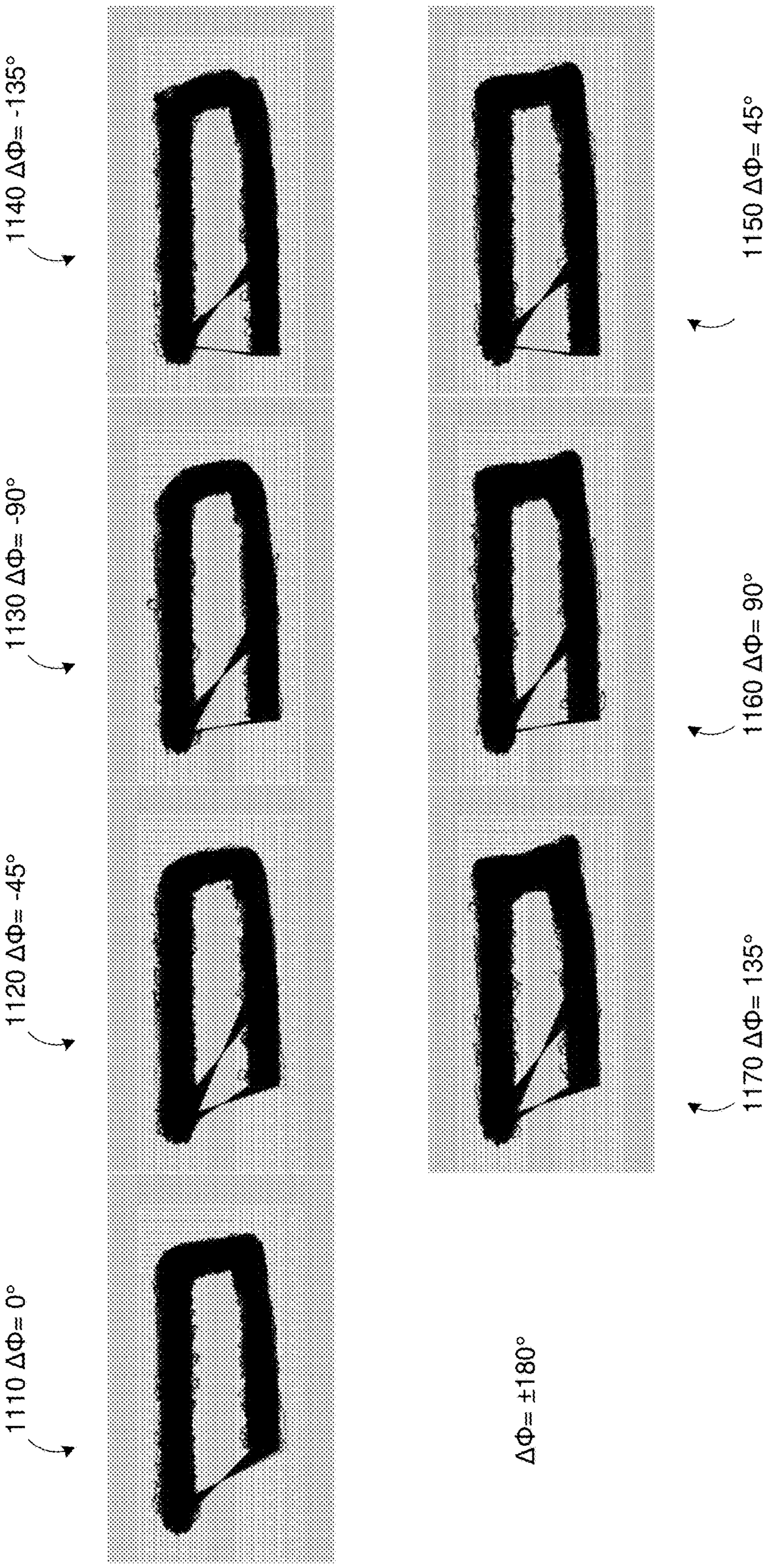
FIG. 11 is a chart sequence illustrating ion flow simulations over a portion of the ion transport channel of FIG. 2, for varying electrode phasings, according to the disclosed technologies.
Figure 12:
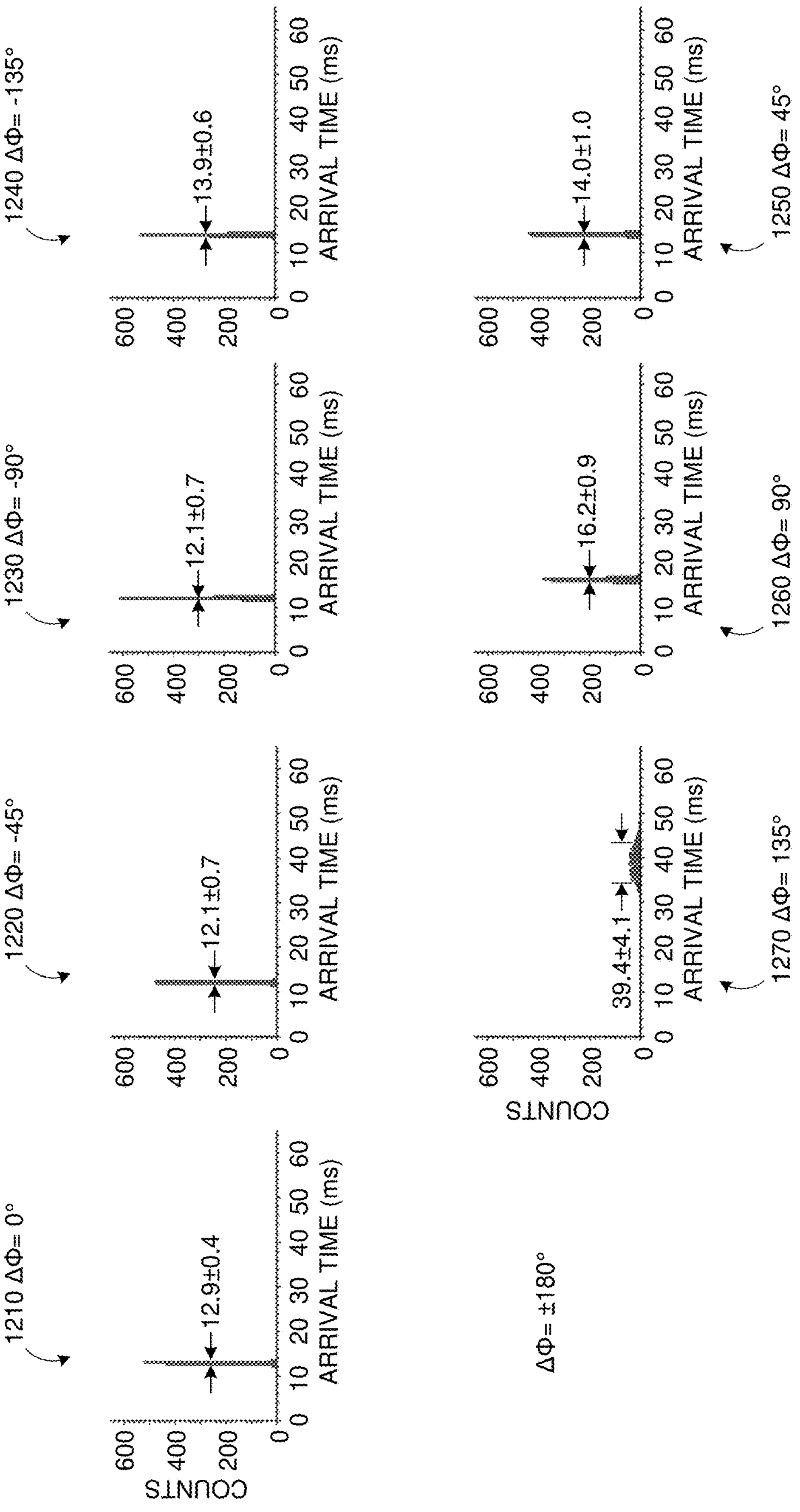
FIG. 12 is a chart sequence illustrating ion transit time distributions corresponding to the simulations and electrode phasings of FIG. 11, according to the disclosed technologies.

Another factor affecting IM separation resolution has now been found to be relative phasing of traveling waves at a bend, as described further herein, e.g. in the context of FIGS. 11-12. Recent studies have shown the feasibility of improving ion transport properties by tuning the relative phasing of traveling waves across a discontinuity in the ion transport channel.

3. Temporal Control of Traveling Waves

IM spectrometers are sometimes integrated with time-of-flight mass spectrometers (TOF MS). The speed of data acquisition in TOF works well for sampling ion packets exiting an IM spectrometer because the separation and resolution of the IM spectrometer can be retained. However, it is often desirable to integrate an IM spectrometer with other mass spectrometers, such as Orbitrap MS, which can provide much better mass resolution than TOF MS. However, Orbitrap MS acquisition can be very slow. Traditionally, this challenge has been addressed using a dual-gate approach. In a dual-gate approach, the first gate introduces an ion packet into the IM separation channel and initiates the IM separation. The second gate samples a narrow window/segment of the ions exiting the IM spectrometer according to their arrival time into the Orbitrap MS for mass analysis. The rest of the ions not selected within the chosen window of time may be discarded. By varying the time delay between the two gates, different windows of the separation can be sampled. Stitching all the acquired Orbitrap MS scans using the knowledge of the delay time between the two gates can reconstruct the IM separation results, with mass analysis superimposed. While successful, the dual-gate approach can result in a significant loss of sample due to the large number of scans required and the discarding of as much as 99% of ions introduced into the IM analyzer. Thus, when available sample amount is limited, the dual-gate approach can be inefficient. In another disclosed innovation, this challenge is addressed using a new approach to operate the IM separation stage. Rather than run the IM analyzer continuously, the IM transport and separation can be suspended (sometimes dubbed "frozen") between MS analyses, so that most ions introduced into the IM system can be analyzed by a downstream MS. In other words, one IM separation run can suffice to perform slow mass analysis on all mobilities of ions.

As described further herein, in certain conditions this technique can also reduce the total time required for dual-modality analysis.

4. Summary

This disclosure discusses new geometric and operating modifications to a SLIM that can improve resolution of an IM spectrometer, improve sample utilization, and/or reduce total experimental time when an IM spectrometer is combined with an MS.

As disclosed herein, these various innovations can be employed together, in any combination. For example, a SLIM can be designed with major segments of a transport channel aligned with its longer extent, and fewer resulting bends; with optimal phasing at bends; and/or with intermittent traveling wave operation.

Still further, the disclosed innovations can be combined with other previously developed techniques to improve IM separation. Non-limiting examples of such prior techniques include switchable recirculation paths or multi-layer SLIM layouts.

Terminology

The usage and meaning of all quoted terms in this section applies throughout this disclosure unless clearly indicated otherwise or inconsistent with the context. The terminology below extends to related word forms.

"AC" (alternating current) and "DC" (direct current) are used to describe sinusoidally varying and steady electrical excitations respectively. The terms can be applied to voltage or current signals. DC extends to quasi-static or slowly varying waveforms.

The term "baseline" refers to a traveling wave configuration having uniform period along an entire ion transport channel. In some disclosed examples, excitation on select segments of the ion transport channel can be advanced or retarded relative to the baseline in order to achieve improved ion transport properties.

A "bend" or "bend segment" (denoted "B") is a segment of an ion transport channel coupled between two major segments and providing a direction of travel different from the longer segments. While the major segments ("M") can often be coupled by a single bend (thus, M-B-M), this is not a requirement and varying examples can be arranged as M-B-B-M, M-B-B-B-M, and so on. Some bends can be elevators between adjacent levels of a multi-layer ion manipulation system.

A "buffer" gas can be used as a background medium for IM separation, and can provide varying collisional drag for different ion species, according to the respective collision cross section (CCS) of each ion species. Buffer gases generally do not react chemically with ion species of interest. Nitrogen is a common buffer gas; however, other gases can be used.

A "channel" or "transport channel" is a region through which ions can be transported, generally having one or more defined directions of travel, with confinement in directions orthogonal to the direction(s) of travel. The direction(s) of travel can be regarded as longitudinal direction(s), while the orthogonal directions can be regarded as transverse directions. In examples, confinement can be provided by electromagnetic and/or electrical fields developed by providing electrical or electromagnetic excitation to confinement electrodes. An elevator channel provides a transport path in an elevator, such as between levels of a multi-level SLIM apparatus. A separation channel provides transport with varying longitudinal speeds so that two or more species can be separated due to their differing speeds, i.e. by velocity dispersion.

A "segment" is a portion of an ion transport channel having uniform or smoothly varying geometry, distinguishable from adjacent segments. In varying examples, a segment can have uniform cross-section, longitudinal period, and orientation, but these are not requirements. Other segments can have tapering or oscillating cross-section, smoothly varying longitudinal period, or smoothly changing direction. Because ion transport channels are often folded to achieve longer path lengths in an apparatus of a given size, such channels often incorporate longer segments joined by shorter segments. The longer segments are sometimes dubbed "major segments" and the shorter segments are sometimes dubbed "bend" segments. Major segments can often be oriented along a common axis, but this is not a requirement. A major segment can have a length greater than half the extent of a supporting substrate in its longitudinal direction. A bend segment can have a length less than half the extent of a supporting substrate in its longitudinal direction or average longitudinal direction.

"Confinement" refers to a phenomenon where ion motion or relative ion motion can be inhibited in one or more directions, or to procedures or devices associated with achieving this phenomenon. Longitudinal confinement refers to inhibition of motion or relative motion along an axis of ion transport. Longitudinal confinement can occur in a surfing mode traveling wave, wherein ions continue to move in a longitudinal direction, but cannot slip with respect to the traveling wave. Longitudinal confinement can also occur in devices such as accumulators or traps. Transverse confinement refers to inhibition of motion in directions orthogonal to an axis of ion transport. In some examples described herein, RF confinement or DC guard potentials or combinations can be used to achieve transverse confinement. Transverse confinement can occur independently of longitudinal confinement.

"Discharge" refers to outputting of ions from one device or subsystem to another.

An "electrical connector" is a physical device providing repeatable attachment and detachment between two sets of electrical conductors. Each set of electrical conductors can include one or more separate conductors, e.g. wires or printed circuit traces. In common embodiments, one set of the electrical conductors is affixed to one connector (sometimes, a female or socket connector), while the other set of electrical conductors is affixed to another connector (sometimes, a male or plug connector). The two connectors can be attached to establish continuous electrically conductive paths between the first and second sets of conductors.

An "electrical signal" is a voltage or current applied from a source to a load, commonly via a medium such as a wire. In some disclosed examples, voltage signals are sourced from a multiphase power supply, transmitted via wires and connectors, and applied to electrodes of an ion manipulation apparatus. Some of these electrical signals can generate traveling waves (e.g. with time-varying electric potentials and fields) in a channel defined by the electrodes. Electrical signals can vary in time (e.g. periodic oscillations at a given electrode or at a given point along a traveling wave) and can vary in space (e.g. a phased relationship between oscillatory signals applied to adjacent electrodes), but neither of these is a requirement. Other electrical signals can be constant (e.g. a stopped waveform, or a signal applied to a guard electrode), or can be uniform in one or more spatial dimension (e.g. a voltage signal along a guard electrode).

An "electrode" is a conductive object to which an electrical excitation can be applied or from which an electrical signal can be sensed. An electrode can be coupled to a proximate medium having lower conductivity than the electrode material. Some electrodes described herein can be used to define ion transport channels and can be implemented as electrically conductive patches on a printed wiring board.

Particularly, diverse electrodes can provide DC guard potential, RF confinement, traveling waves, magnetic fields, or electric field gradients. Electrodes can be arranged in patterns or banks.

An "elevator" is a vertical ion transport channel coupling two or more horizontal planar SLIMs. That is, given two parallel planar SLIMs, a transport channel providing a direction of travel perpendicular to the SLIM planes can be dubbed an elevator.

"Excitation" refers to a control signal applied to a device to control its functioning. Some examples described herein employ electrical excitation to electrodes of an ion manipulation system, in the form of a voltage or current signal. An electrical excitation can be static or quasi-static DC, a traveling wave, AC, RF, or combinations. Other forms of excitation include magnetic, which can generate induced currents, or electromagnetic, such as an optical or visible light beam.

"Extent" refers to a maximum dimension of an object in a given direction. In the context of electrodes and segments, "longitudinal extent" is a dimension along a direction of propagation of a traveling wave on those electrodes or segments.

A "frame" is a generally rigid mechanical structure to which other objects or devices can be affixed. The rigidity of a frame does not preclude a frame having provision for movable parts (such as hinged doors or panels) or detachable parts (such as electrical connectors).

A "gate" is a device or portion thereof whose state can be controlled over time in at least open and closed states. An example gate can apply electrostatic potentials to block (gate closed) or allow (gate open) flow of ions from one side of the gate to another.

An "ion" is an atom or molecule with a net electrical charge.

An "ion injector" is a device coupled to supply ions to an ion manipulation subsystem or to another piece of equipment.

"Ion loss" refers to the ions not emerging from the exit of an ion manipulation system, as a fraction of the ions injected into the ion manipulation system.

"Ion mobility separation" ("IM separation") is a technique that can be based on differences in mobility of different ion species in a background medium such as a neutral buffer gas. In examples, ions experience a longitudinal electrical force in a direction of travel due to applied electric fields, with an opposing drag force due to collisions with buffer gas molecules. The resulting velocity, at which these forces are close to balance, can be species dependent, e.g., based on mass, charge, and shape of an ion species. The resulting velocity dispersion can be used to separate ion species as they are transported along a channel.

An "ion receiver" is a device coupled to receive ions from an ion manipulation subsystem or from another piece of equipment. In some disclosed examples, an ion receiver can be an MS.

"Ion transit time" is the time taken by ions to be transported from entrance to exit of an ion manipulation system such as an IM separation system, not counting time when waveforms are held stationary. Ion transit time can be dependent on mobility, and can also vary between like ions due to statistical fluctuations in collisions experienced by such ions. Thus, for a particular ion species, ion transit times can have a distribution, and this distribution can have a width, such as full width at half maximum, interquartile width, standard deviation, or another similar measure.

"Longitudinal" refers to a direction along an ion transport channel along which a traveling wave can propagate or ions can flow. Directions orthogonal to the longitudinal direction are dubbed "transverse". Longitudinal and transverse can be local and can vary as an ion transport channel changes direction. Occasionally, the term "longitudinal" can refer to an overall length dimension of a device or subsystem.

A "mass spectrometer" (MS) is an apparatus for measuring a quantity and the mass to charge ratio (m/Z) of one or more species, discriminated by mass. Some types of MS include time-of-flight (TOF or TOF-MS) or quadrupole (QMS). An MS can be cascaded with an IM spectrometer, another MS, or another analytic instrument.

Two "opposed surfaces" face each other, e.g., across an ion transport channel. The term does not preclude having a coating over one or both surfaces, i.e., the surfaces need not be exposed.

"Orientation" refers to a physical direction which an object is aligned with.

A "path" is a generally linear track or route, position along which can be specified by a single coordinate. A path can be curved or folded to occupy a one-dimensional, two-dimensional, or three-dimensional extent. A path can have a finite width commonly less than one tenth the length along the path. Some paths described herein are ion transport channels, along which ions can be guided by suitable electromagnetic fields. Because of the finite width of such a path and variations in the initial conditions among the ions, ions traveling along such a path need not follow exactly the same trajectory.

"Phase" is a parameter indicating a temporal relationship between two points on an oscillatory signal. Phase is commonly described in angular units, with 360° indicating one complete oscillation, so that phases separated by an integer multiple of 360° are indistinguishable. The phase of an oscillatory signal can be "advanced" or "retarded" relative to a reference by causing a given feature of the signal to occur at an earlier or later time, respectively. A "phase shift" is a change in phase relative to a baseline or other reference.

A "planar" surface or device has a two-dimensional extent, which can be curved or flat (no curvature). A curved plane can have a continuously varying surface normal, i.e. no creases. A planar device commonly has a thickness at most one tenth its extent in any direction within its plane.

A "port" is a structure of a device by which a material (e.g. a gas) or a signal (e.g. an electrical excitation) can be introduced into or extracted from the device.

A "power supply" is a device that supplies electrical signals, e.g. to electrodes of an ion manipulation system. In disclosed examples, a "multi-phase power supply" has multiple outputs having controlled phase relationships. To illustrate, an eight phase power supply can supply oscillatory signals in 45° phase increments simultaneously.

The "propagation speed" of a traveling wave is the magnitude of the phase velocity of the traveling wave, e.g. the distance traveled by a particular waveform feature (e.g. crest, trough, or zero crossing) in unit time.

A "recirculation path" is a path whereby ions nearing an exit from an ion manipulation apparatus can be redirected, within the apparatus, to a point near an entrance to the apparatus. A recirculation path can be switchable so that, for a predetermined number of transits through the apparatus, the ions are directed along the recirculation path and, on a next transit, the ions are directed to the exit.

"Resolving power" is a property of a spectrometer which can be determined from a spectral peak, as the ratio of the abscissa of the centroid of the peak to a width of the peak.

To illustrate, an MS having a peak at m/Z=500 with a width of 0.1 has a resolving power of 500/0.1=5,000.

"RF" stands for radio frequency, covering a range from about 30 kHz to about 300 GHz (the RF frequency range), and is generally understood to refer to electromagnetic radiation and processes in that frequency range. "RF" is also used as an adjective to describe components, processes, quantities, or attributes thereof, that are operable at or associated with processes occurring at a frequency or range of frequencies within the RF frequency range.

"Serpentine" refers to a path or ion transport channel having multiple bends so as to pack a large path length in a small area or volume. In some examples, a serpentine path can have a length significantly greater than a maximum dimension of a containing area or volume. For example, a planar serpentine path can have a length at least 5, 10, 20, 50, or 100 times the maximum linear dimension of an enclosing boundary around the serpentine path. In some examples described herein, a stack of planar serpentine ion transport channels can be used to efficiently pack a composite ion transport path (tens or hundreds of meters, or even more) into a practical volume (less than 1 cm, 10 cm, or 1 m on a side).

A "SLIM" is a Structure for Lossless Ion Manipulation. Some SLIMs described herein can provide an ion transport path defined by electrodes to which electrical or electromagnetic excitation can be applied. The SLIM can be generally linear (straight or curved), two-dimensional (straight or curved), or three-dimensional. A multi-level SLIM described herein can be formed by arranging multiple one- or two-dimensional SLIMs on successive layers of a three-dimensional structure, with elevators arranged to couple the successive layers.

A "substrate" is a device on which other devices can be fabricated or mounted. In some disclosed examples, a printed wiring board can be used as a substrate, with electrodes and associated wiring formed thereon. Commonly, two facing substrates can support respective electrodes and an ion transport channel can be formed between the substrates.

A "switch" is a device that can be controlled to guide ions over one of two or more paths.

The terms "top," "bottom," "up," "down," "horizontal," "vertical," and the like are used for convenience, with respect to a given figure or a common configuration in which ion transport levels are generally regarded as horizontal. One of ordinary skill will understand from this disclosure that a choice of actual orientation can be varied without departing from the scope of the disclosed technologies.

"Transport" refers to a phenomenon or process of moving ions along a channel. In some examples, transport can be achieved by a balance of longitudinal electric fields and collisional drag with a background neutral buffer gas, however this is not a requirement. In other examples, buffer gas can be omitted, or streaming buffer gas can be used to accelerate ions.

A "trap" can refer to an apparatus for collecting or storing ions; the term "trap" can also be applied to a process for collecting or storing ions in such an apparatus.

A "traveling wave" (TW) refers to an electric potential waveform having at least one trough and at least one crest that propagates along a channel. Commonly, a traveling wave is formed by applying appropriate excitation to a series of electrodes disposed around the channel, and the TW designation can also apply to these excitations and these electrodes. When used for IM separation, a TW can be continuous or can extend over multiple periods, however this is not a requirement. In other examples, a TW can be a single period (or even as little as half a period) of an oscillatory waveform. Multiple periods of a TW waveform can be regular or irregular, for example, stuttering or burst waveforms can be used in certain applications. When used for IM separation, it can be desirable for the TW amplitude to be below a first threshold at which all ion species of interest can pass over crests from one trough to the next; such a configuration is considered to in "separation mode." For some elevator configurations, it can be desirable for the TW amplitude to be above a second threshold at which no ion species of interest can pass over a crest, i.e. all species of interest experience longitudinal confinement within the TW and can be carried by the TW at the TW speed; such a configuration is considered to be a "surfing mode."

Example Ion Manipulation System

Figure 1:
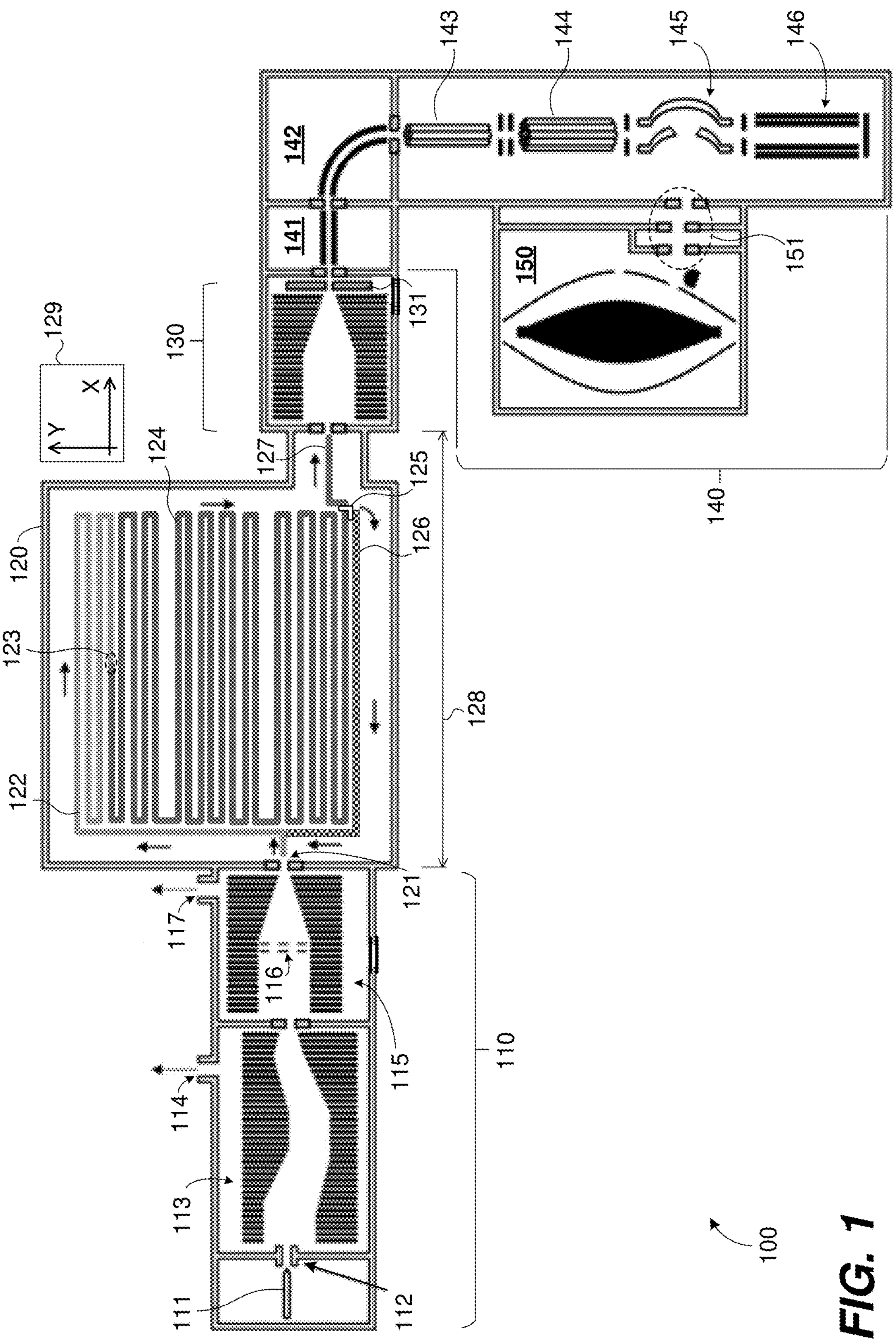
FIG. 1 is a schematic diagram of an example multi-level ion manipulation system according to the disclosed technologies.

FIG. 1 is a schematic diagram of an example multi-level ion manipulation system 100 according to the disclosed technologies. This system combines an IM spectrometer with an MS, suitable for research using proteomics, lipidomics and other biological studies.

At a high level, system 100 incorporates four subsystems: ion injector 110, SLIM 120, ion receiver 130, and mass spectrometer 140. These are described in turn.

Ion injector 110 is shown having several sections. Ion source 111 can generate ions by any of a variety of techniques. Electrospray ionization (ESI) or matrix-assisted laser desorption/ionization (MALDI) can be suitable for lipids, carbohydrates, peptides, proteins, nucleic acids, or other macromolecules, but this is not a requirement. In other examples, ion source 111 can employ electron ionization (EI), chemical ionization (CI), or other available techniques. Generated ions can be directed through aperture 112, which can be a multi-capillary inlet, and high-pass S-shaped ion funnel 113, into a second linear funnel 115 which includes inlet ion gate 116. Electrostatic potentials applied to electrodes in funnels 113, 115 can reject ions with energy below a threshold or direction of propagation outside an acceptance cone, to obtain a collimated flow of ions toward SLIM 120 when ion gate 116 is in an open state. Pumping ports 114, 117 can be coupled to rough pumps to maintain a low pressure (approximately 2 Torr nitrogen) within stages 115, 117. Although not shown, similar pumping ports can be provided on other components of system 100.

An electrostatic potential applied to ion gate 116 can control the state of ion gate 116. To illustrate for positively charged ions, a positive voltage (relative to electrodes of filter 115) can be applied to ion gate 116 to put it in a closed state, blocking the flow of ions across gate 116; and a zero or negative voltage can be applied to put ion gate 116 in an open state, allowing ions to flow across ion gate 116. For negatively charged ions, opposite polarities can be used to obtain closed or open states. When ion gate 116 is in a closed state, ions can be accumulated in filter 115, to the left of ion gate 116. In some applications, ion gate 116 can be pulsed open one or more times to introduce respective bursts of accumulated ions into SLIM 120.

IM separation subsystem 120 is illustrated as a planar SLIM having a serpentine path of length of about 11 m from inlet port 121 to outlet-side switch 125. The overall extent 128 of SLIM 120 is 23.865" in the X direction (with axes according to inset 129), and the serpentine path (sections 122 and 124) has overall dimensions of 18.955" (X) by 13.780" (Y). There are 23 major segments oriented in the X direction, with adjacent pairs coupled by short bends providing U-turns; there are also four right angle bends. As described in context of FIGS. 9-10, SLIM 120 has fewer bends than if the major segments were oriented in the Y-direction.

Ion transport sections 122, 124 can be separately controlled. In some examples, section 124 can be operated in a normal mode with traveling wave electrode excitations about 20-30 V peak-to-peak for efficient IM separation, while section 122 can initially be operated at a lower voltage, e.g. about 2 V peak-to-peak, to obtain slower propagation of ions through section 124. The slower propagation can enable a long temporal burst of ions to be introduced into SLIM 120 over a short spatial distance, or multiple short bursts. Thereafter, section 122 can be excited with higher amplitude traveling waves, e.g. matching or comparable to section 124, to increase effectiveness of mobility separation in SLIM 120. However, this mode of operation is not a requirement, and other innovative examples can provide uniform control of both sections 122, 124. Any of the innovative waveform controls can be applied to one or both of sections 122, 124. For clarity of illustration, the junction 123 between sections 122, 124 is also marked in FIG. 1.

Additionally, SLIM 120 incorporates recirculation path 126 whereby ions reaching switch 125 can be diverted back to rejoin section 122 near inlet 121. To illustrate, switch 125 can be controlled to recirculate ions via path 126 for several ion transits through SLIM 120, after which the state of switch 125 can be changed to allow ions to be output via exit section 127. Recirculation enables a large increase in the total path over which ions undergo IM separation. To illustrate, ten transits through an 11 m serpentine path can provide IM separation over 110 m, with an attendant increase in resolution. Recirculation also increases the effective number of bends through which ions travel. Accordingly, disclosed innovations for phase control at bends can have greater value than in a single transit SLIM.

While subsystem 120 is illustrated as a planar SLIM, this is not a requirement, and other IM separation apparatuses can be used. As examples, subsystem 120 can be implemented as a multi-layer SLIM, or as a hybrid combining traveling wave sections with other ion transport or separation techniques.

Ion receiver 130 is shown coupled to receive ions discharged from SLIM 120 via exit section 127. Receiver 130 is depicted as a linear funnel similar to funnel 115. Ion gate 131 can be electrostatically controlled between a closed state (e.g. with a positive voltage applied, for positive ions) in which discharged ions can be accumulated within receiver 130, and an open state (e.g. with a negative voltage applied) in which ions can flow through gate 131 into MS 140. Notably, in some innovative examples gate 131 can be omitted, and ions can be intermittently discharged directly from SLIM subsystem 120 into downstream analyzer 140. In such examples, downstream analyzer 140 can itself be the ion receiver.

Turning to downstream analyzer 140, an exemplary mass spectrometer configuration is shown, having ion transfer stages 141-146, ion transfer lens 151, and Orbitrap cell 150 in which high-resolution mass separation can be performed. Stages 141-142 can be focusing devices having flat electrodes, sometimes known as "flatapoles," stages 143-144 can be quadrupoles for mass filtering, and stage 145 can be a C-trap for storing ions. Optionally, a high-energy collision dissociation cell 146 can be included to cause fragmentation of ions prior to mass separation. Z lens 151 can provide spatial focusing of ions into Orbitrap cell 150. The Orbitrap configuration is exemplary: other examples can incorporate fewer, more, or different stages, and other types of mass spectrometers can also be used.

Ion Flow Example

Figure 2:
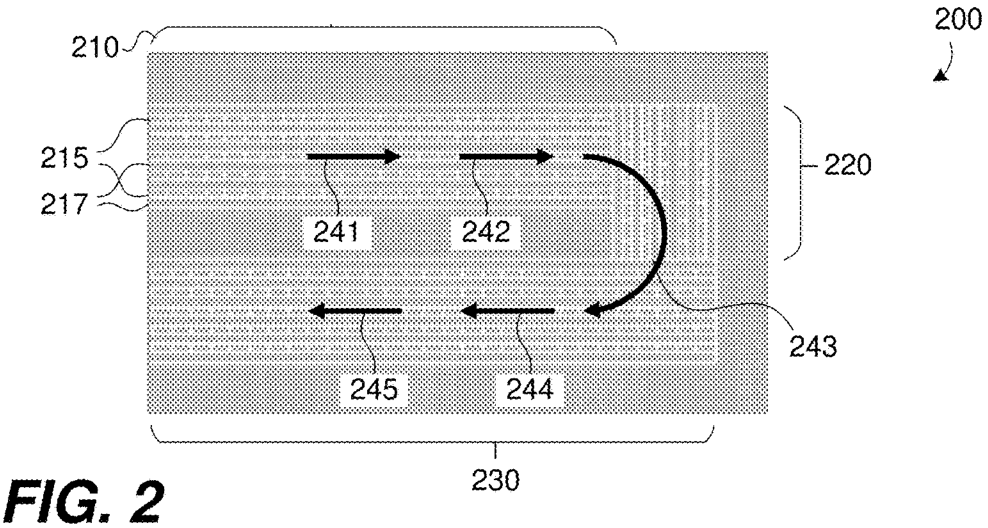
FIG. 2 is a schematic diagram illustrating ion flow along a segmented ion transport channel according to examples of the disclosed technologies.

FIG. 2 is a schematic diagram 200 illustrating ion flow along a segmented ion transport channel. In this diagram, three segments of an ion transport channel are shown.

In first segment 210, five rows of electrodes 215 can be excited to generate a first traveling wave which can carry ions from left to right (toward segment 220) as shown by arrows 241-242. These rows of electrodes 215 constitute a first set of electrodes and can be interspersed with additional electrodes 217 which extend continuously in the longitudinal direction. Additional electrodes 217 can provide RF excitation and/or guard potentials.

In a second segment 220, five rows of electrodes can be excited to generate a second traveling wave which can carry ions downward in FIG. 2. These rows of electrodes constitute a second set of electrodes and can be interspersed with additional electrodes similar to electrodes 217 of segment 210, also providing RF excitation and/or guard potentials. Momentum changes of ions can be gradual as the ions transit from segment 210 to segment 220, and ions can generally follow a curving trajectory represented by arrow 243.

In a third segment 230, another five rows of electrodes can be excited to generate a third traveling wave which can carry ions from right to left (away from segment 220). These rows of electrodes constitute a third set of electrodes and are shown interspersed with additional electrodes similar to electrodes 217 of segment 210. Momentum changes of ions can be gradual as the ions transit from segment 220 to segment 230, and ions can generally follow a curving trajectory represented by arrow 243, and then a generally straight path along segment 230 as shown by arrows 244-245.

However, the arrows in FIG. 2 are merely illustrative, and the actual trajectory of any given ion can depend on the details of its input velocity vector, the phases of traveling waves it encounters, and its collisions with buffer gas molecules. That is, the trajectory of a particular ion can have varying direction, with some zigzags, while generally following arrows 241-245.

Electrode Phasing Examples

Figure 3:
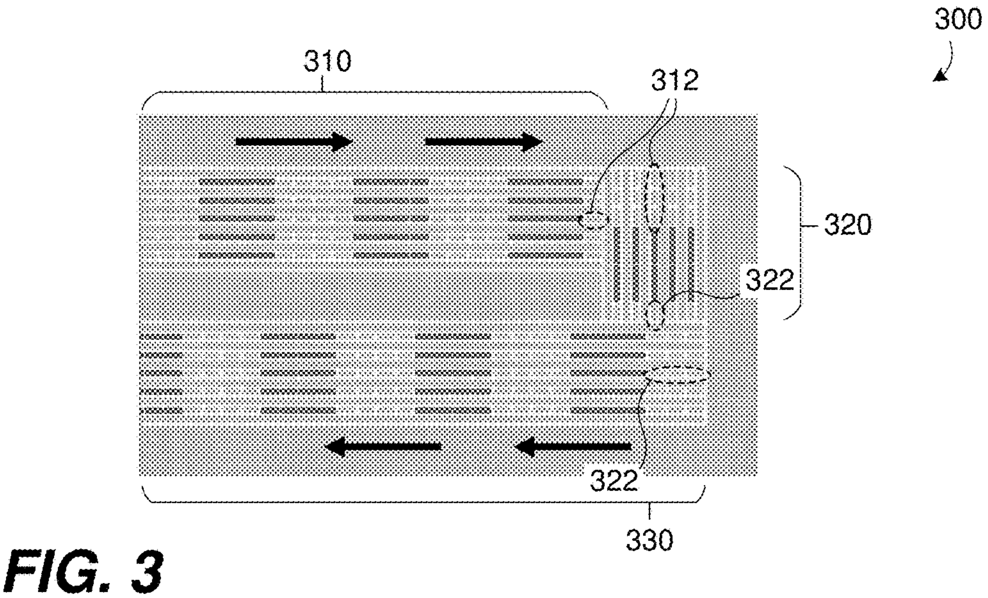
FIG. 3 is a schematic diagram illustrating conventional electrode phasing in a segmented ion transport channel.

FIG. 3 is a schematic diagram 300 illustrating conventional electrode phasing in a segmented ion transport channel. The electrode layout is similar to that of FIG. 2. For purposes of illustration, certain electrodes are shaded dark to indicate phasing of the traveling waves applied to each of segments 310, 320, 330. FIG. 3 represents a snapshot in time (the "snapshot time"). Each set of electrodes can have a square-wave excitation applied, with dark shaded electrodes having positive polarity at the snapshot time, and the other electrodes in each row having negative polarity. A period of the traveling wave spans eight electrodes in the longitudinal direction, four having positive polarity (shaded dark), and the next four having negative polarity (unshaded). At the snapshot time, the transition from segment 310 to segment 320 occurs at a negative polarity of the first or second traveling wave. Because there are four negative polarity electrodes 312 between the last positive polarity electrode in a given row of segment 310 and the first positive polarity electrode in segment 320, and also four negative polarity electrodes 322 between the last positive polarity electrode in a given row of segment 320 and the first positive polarity electrode in segment 330, this configuration can be dubbed a "baseline configuration." This baseline configuration has been used in the art for bends in ion transport channels.

Figure 4:
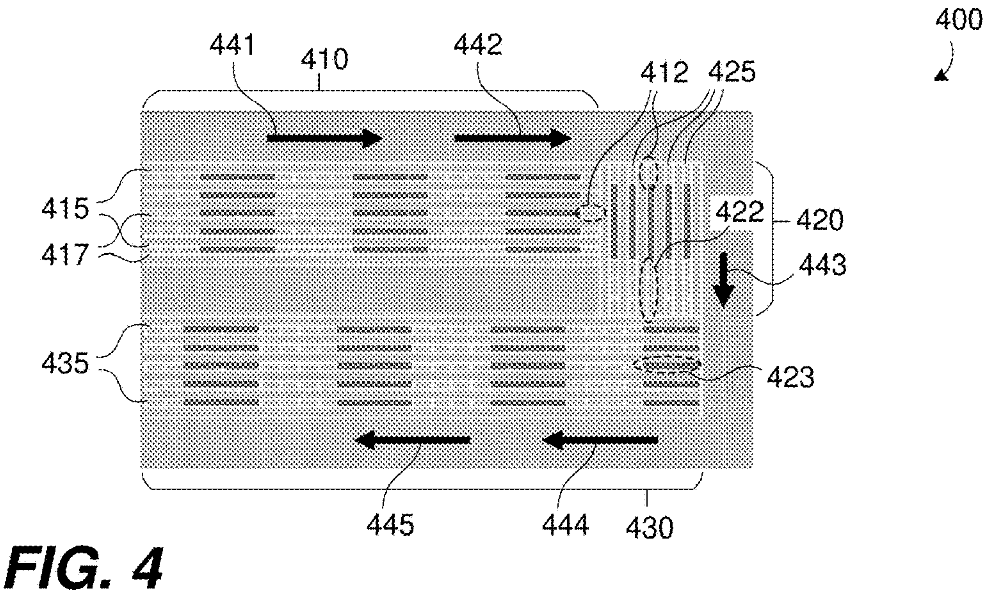
FIG. 4 is a schematic diagram illustrating another example of electrode phasing according to the disclosed technologies.

FIG. 4 is a schematic diagram 400 illustrating a contrasting example of electrode phasing according to the disclosed technologies. The electrode layout 415, 417 is similar to that of FIGS. 2-3. Certain electrodes are shaded dark to indicate phasing of the traveling waves applied to each of segments 410, 420, 430. The traveling waves propagate in directions shown by arrows 441-445. FIG. 4 also represents a snapshot in time. As for FIG. 3, each set of electrodes 415, 425, 435 can have a square-wave excitation applied, with dark shaded electrodes having positive polarity at the snapshot time, and the other electrodes in each row having negative polarity. A period of the traveling wave spans eight electrodes in the longitudinal direction, four having positive polarity (red), and the next four having negative polarity.

At the snapshot time, the transition from segment 410 to segment 420 occurs at a negative polarity of the first or second traveling wave. However, unlike FIG. 3, there are only two negative polarity electrodes 412 between the last positive polarity electrode in a given row of segment 410 and the first positive polarity electrode in segment 420. Accordingly, the phase of the traveling wave on segment 420 is retarded (brought closer spatially) by 90° (two electrodes out of eight electrodes in a full period) relative to the traveling wave on segment 410. (Retardation and advancement of waveforms are described further herein in context of FIG. 5.) For the next period of the traveling wave, which spans a transition from segment 420 to segment 430, the period is also shortened by two electrodes: the negative polarity portion 422 is only three electrodes long and the positive polarity portion 423 is also three electrodes long (instead of four each). Thus, the traveling wave on segment 430 is retarded by an additional 90°.

The inventors have found that selection of relative phasing between segments of the ion transport channel can have an impact ion transport and ion separation performance, which was unexpected. Additionally, certain phasings can offer superior performance in one or more parameters as compared to the baseline configuration, which is a surprising result.

Figure 5:
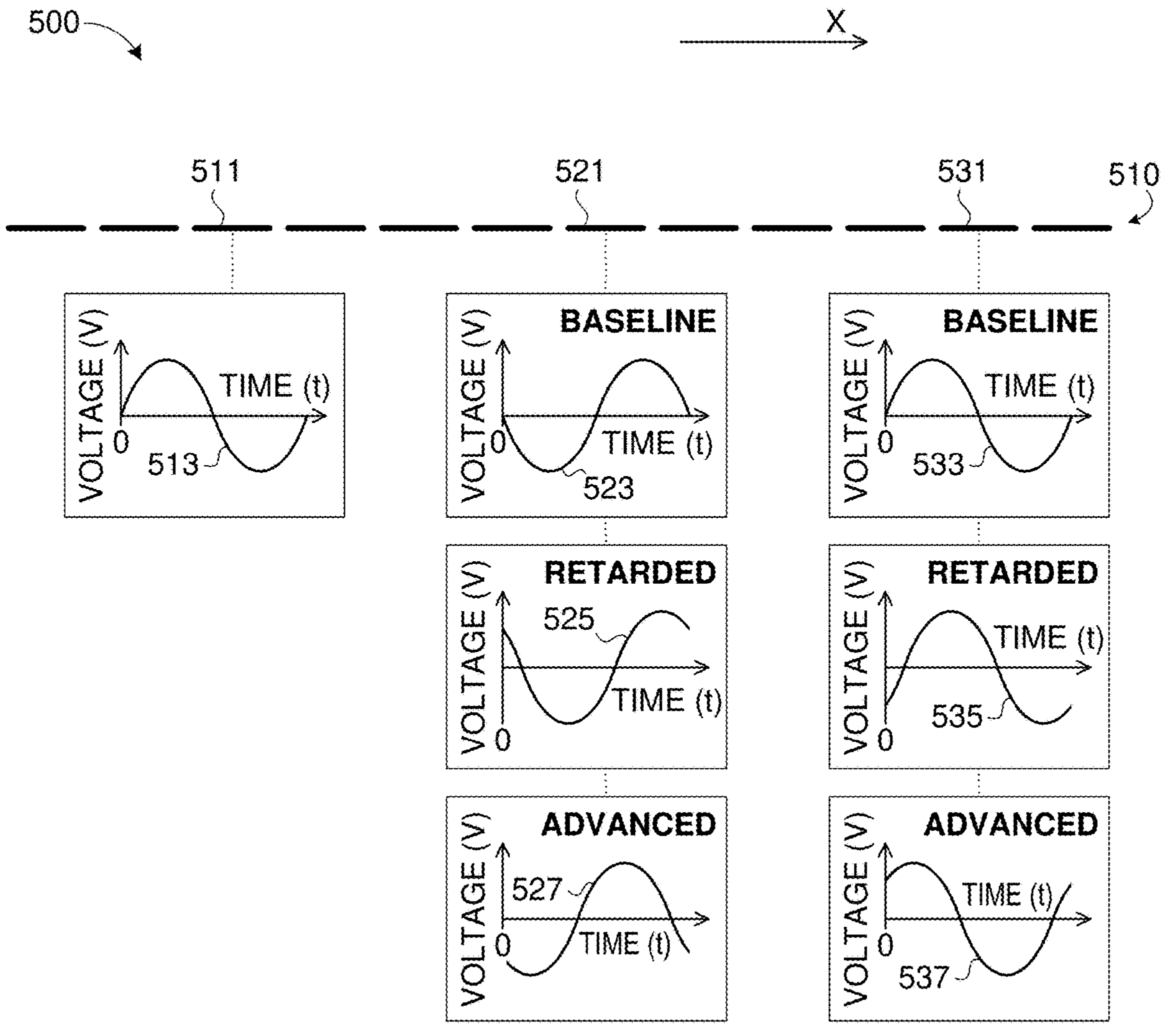
FIG. 5 is a diagram illustrating additional examples of electrode phasings according to the disclosed technologies.

FIG. 5 is a diagram 500 illustrating additional examples of electrode phasings relative to a baseline. A row of electrodes 510 includes electrodes 511, 521, 531 spaced four apart. For this illustration, a traveling wave having nominal period of eight electrodes is considered applied to electrodes 510. This discussion is presented from the point of view of a traveling wave propagating from left (electrode 511) to right (electrode 531), however the illustrated waveforms are equally applicable to a wave traveling from right to left.

The sinusoidal traveling waves shown can be expressed in a form $A \cdot \sin((2\pi/\lambda)x-(2\pi f \cdot t+\Delta\Phi))$, where A is an amplitude, $\lambda$ is a wavelength in the x direction, f is a temporal frequency, t is time, and $\Delta\Phi$ is a phase shift that can be selectively applied. A phase shift in the open interval (−180°, 0°) is a retardation, and a phase shift in the open interval (0°, 180°) is an advancement, relative to a baseline case with $\Delta\Phi=0°$.

Electrodes 511, 531 are spaced one period apart. Thus, in a baseline configuration ($\Delta\Phi=0°$), baseline waveform 533 applied to electrode 531 is identical to waveform 513 applied to electrode 511. Electrodes 511, 521 are spaced half a period apart. Thus, in the baseline configuration, baseline waveform 523 applied to electrode 521 is 180° out-of-phase to waveform 513 applied to electrode 511.

Waveforms 525, 535 are shifted later in time (i.e. retarded) as compared to baseline waveforms 523, 533, as can be seen by comparing zero crossings or other waveform features. With electrode 531 retarded according to waveform 535, a given point on waveform 513 takes longer to reach electrode 531 than in the baseline configuration. Because the traveling wave takes more than one temporal period to travel eight electrodes, the distance propagated in one temporal period is less than eight electrodes. That is, retardation of a downstream waveform can correspond to shortening of a spatial period.

Conversely, waveforms 527, 537 are shifted earlier in time (i.e. advanced) as compared to baseline waveforms 523, 533.

With electrode 531 advanced according to waveform 537, a given point on waveform 513 takes less than one temporal period to travel the eight electrode distance from electrode 511 to electrode 531. That is, the traveling wave propagates more than eight electrodes in one temporal period. Advancement of a downstream waveform can correspond to lengthening of a spatial period.

For convenience of illustration, excitations 513-537 are shown as sinusoidal waves, but this is not a requirement. In varying examples, square waves, triangular waves, or other periodic waveforms can be used to excite electrodes 510.

Additionally, phases repeat every 360°, so that a retardation of 5° is indistinguishable from an advance of 355°. In this disclosure, where different amounts of advance or retardation are being compared, phase shifts are sometimes described as amount of retardation in an interval [0°, 360°) for consistency. Elsewhere, individual phase shifts may be described, for convenience of description, as advancement or retardation in a range [0°, 180°].

First Example Method

Figure 6:
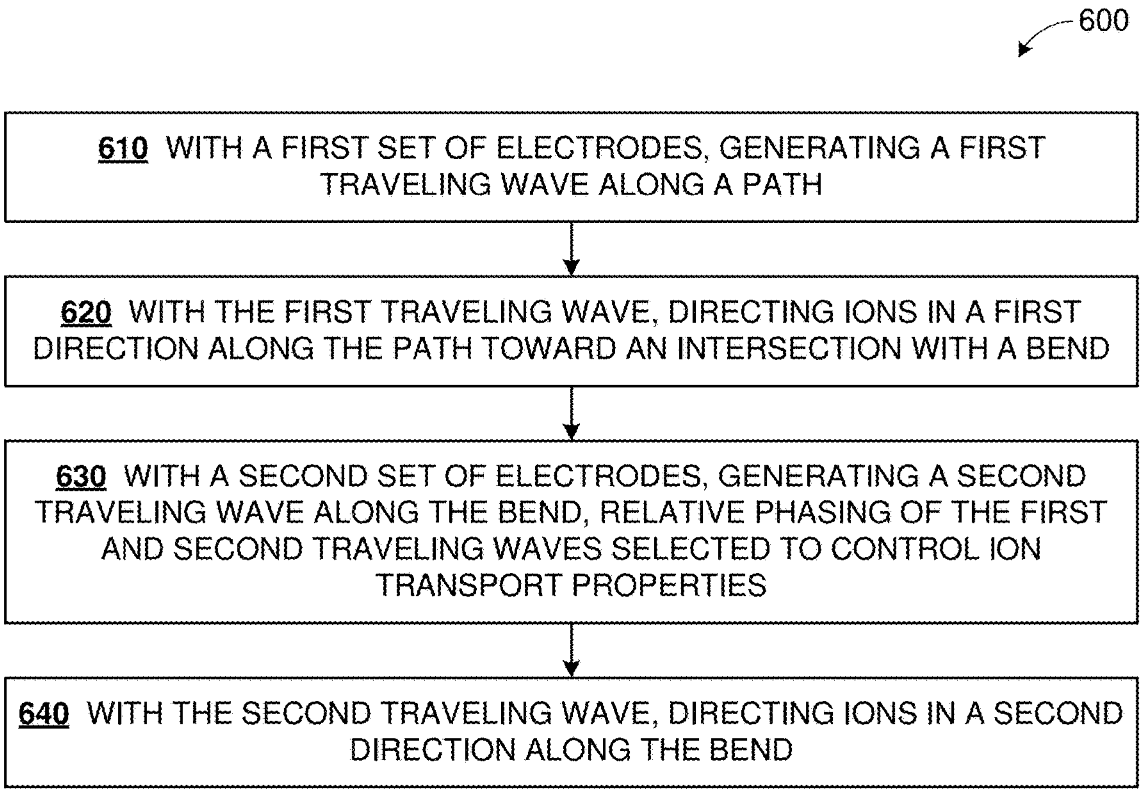
FIG. 6 is a flowchart of a first example method according to the disclosed technologies.

FIG. 6 is a flowchart 600 of a first example method. In this method, a controlled phasing is used to direct ions around a bend.

At block 610, voltage signals can be applied to a first set of electrodes to generate a first traveling wave along a path. To illustrate, the first set of electrodes can be similar to electrodes 415 of FIG. 4, which can define a portion of a path along segment 410 (which can be similar to segment 1012 of FIG. 10). The first traveling wave can propagate in the direction of arrows 441-442.

At block 620, ions can be directed in a first direction (e.g. as indicated by arrows 441-442) along the path toward an intersection with a bend. The bend can be another path, or portion of a path, adjacent to the path or portion defined by the first set of electrodes. To illustrate, a bend can be similar to segment 420 of FIG. 4, and the intersection can be a junction or interface between segments 410-420.

At block 630, voltage signals can be applied to a second set of electrodes to generate a second traveling wave along the bend. The relative phase of the second traveling wave, with respect to the first traveling wave, can be selected to control one or more properties of the directed ions. To illustrate, the second set of electrodes can be similar to electrodes 425 of FIG. 4, which can define a portion of a path along segment 420 (which can be similar to segment 1014 of FIG. 10). The first traveling wave can propagate in the direction of arrow 443.

At block 640, the ions can be directed in a second direction (e.g. as indicated by arrow 443) along the bend. As shown, the second direction (arrow 443) is different than the first direction (arrows 441-442).

Numerous variations and extensions of this method can be implemented within the scope of disclosed technologies. In examples, the phase of the second traveling wave relative to the first traveling wave can be selected to optimize one or more ion transport properties, such as ion transit time, resolving power, ion loss, or width of an ion transit time distribution.

In further examples, voltage signals can be applied to a third set of electrodes to generate a third traveling wave along a further path. The phase of the third traveling wave, relative to the second traveling wave, can also be selected to control one or more properties of the directed ions. To illustrate, the third set of electrodes can be similar to electrodes 435 of FIG. 4, which can define a portion of a path along segment 430 (which can be similar to segment 1016 of FIG. 10). The third traveling wave can propagate in the direction of arrows 444-445. The ions can be directed in a third direction (e.g. arrows 444-445) along the further path, different from the second direction (e.g. arrow 443).

Example Ion Manipulation Subsystem

Figure 7:
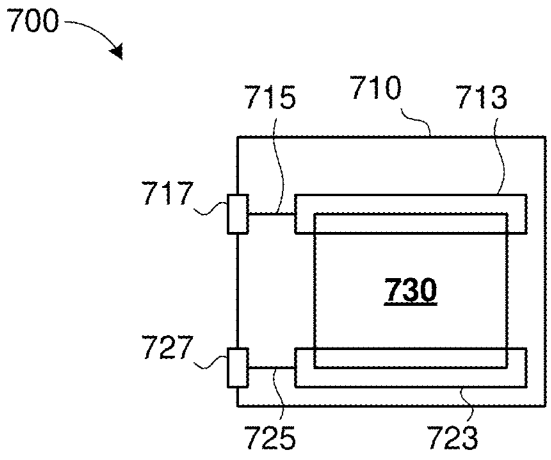
FIG. 7 is a schematic diagram of an example ion manipulation subsystem according to the disclosed technologies.

FIG. 7 is a schematic diagram of an example ion manipulation subsystem 700. In subsystem 700, apparatus 730 can incorporate one or more instances of electrode arrangements, similar to FIG. 4, having relative phasing configured as described in context of FIG. 4, FIG. 6, or elsewhere herein. Sets of electrodes can be affixed to two facing substrates 713, 723 to form an ion transport channel between substrates 713, 723. In turn, substrates 713, 723 can be affixed within frame 710, and one or more electrical connectors 717, 727 can be provided to couple electrical signals (e.g. from a multi-phase power supply, not shown) to the electrodes of apparatus 730 via wiring 715, 725. These electrical signals can produce traveling waves on respective sets of the electrodes, with relative phasing between adjacent traveling waves selected as described herein.

Numerous variations and extensions of subsystem 700 can be implemented within the scope of disclosed technologies. For example, multiple first sets of electrodes of apparatus 730 (e.g. similar to electrodes 415 or 435 of FIG. 4) can define major segments of the ion transport channel (e.g. similar to segments 410, 430 of FIG. 4; or segments 1012, 1016 of FIG. 10). Multiple second sets of electrodes (e.g. similar to electrodes 425 of FIG. 4) of apparatus 730 can define bend segments (e.g. similar to segment 420 or 1014). In further examples, ion manipulation subsystem 700 can be configured to perform IM separation, achieving a resolving power of at least 500, or at least 250.

In some examples, ion manipulation subsystem 700 can include a switchable recirculation path, e.g. similar to path 126 of FIG. 1.

Example Ion Manipulation System

Figure 8:
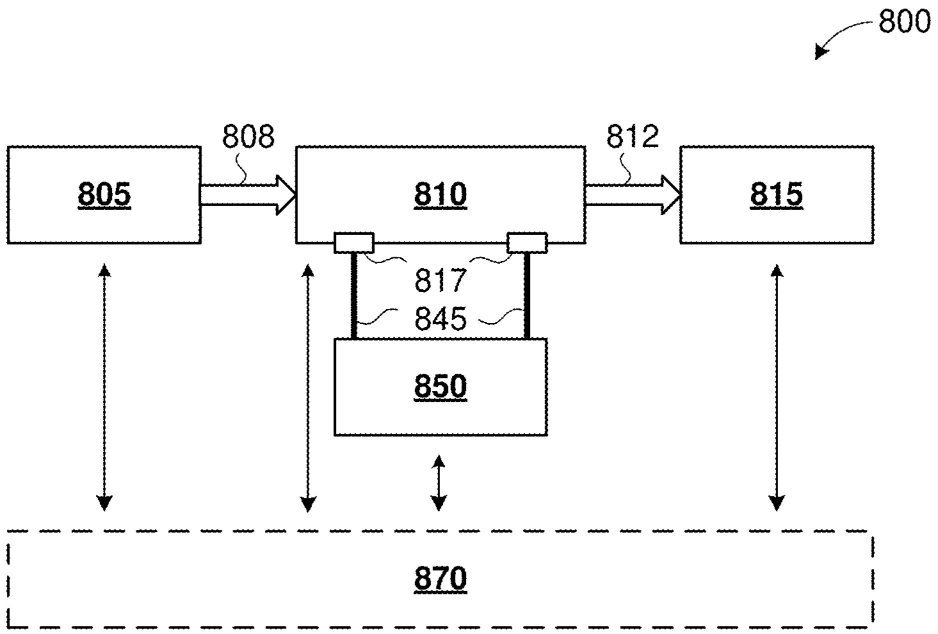
FIG. 8 is a schematic diagram of an ion manipulation system according to the disclosed technologies.

FIG. 8 is a schematic diagram of an ion manipulation system 800 which, in some examples, can perform IM separation. In system 800, ion injector 805 can be coupled to deliver ions (as indicated by arrow 808) to ion manipulation subsystem 810, which can be similar to subsystem 700 of FIG. 7. Ion receiver 815 can be coupled to receive ions (as indicated by arrow 812) output from subsystem 810. In examples, the outputted ions can be one or more buckets of ions separated according to mobility by subsystem 810. Multiphase power supply 850 can be coupled to one or more electrical connectors 817 by busses 845, to provide electrical signals to subsystem 810 for developing traveling waves along an ion transport channel within subsystem 810.

Numerous variations and extensions of subsystem 700 can be implemented within the scope of disclosed technologies. Ion injector 805, ion manipulation subsystem 810, and ion receiver 815 can be respectively similar to ion injector 110, SLIM 120, and ion receiver 130 of FIG. 1. In examples, system 800 can further include a mass spectrometer, e.g. coupled to ion receiver 815 or 130 and similar to MS 140 of FIG. 1. In further examples, controller 870 can be coupled to transmit control signals or receive monitoring signals from injector 805, subsystem 810, receiver 815, or power supply 850. Controller 870 is shown in dashed outline indicating that it can be included in some embodiments of system 800 and omitted from other embodiments.

Electrode Layout Examples

Figure 9:
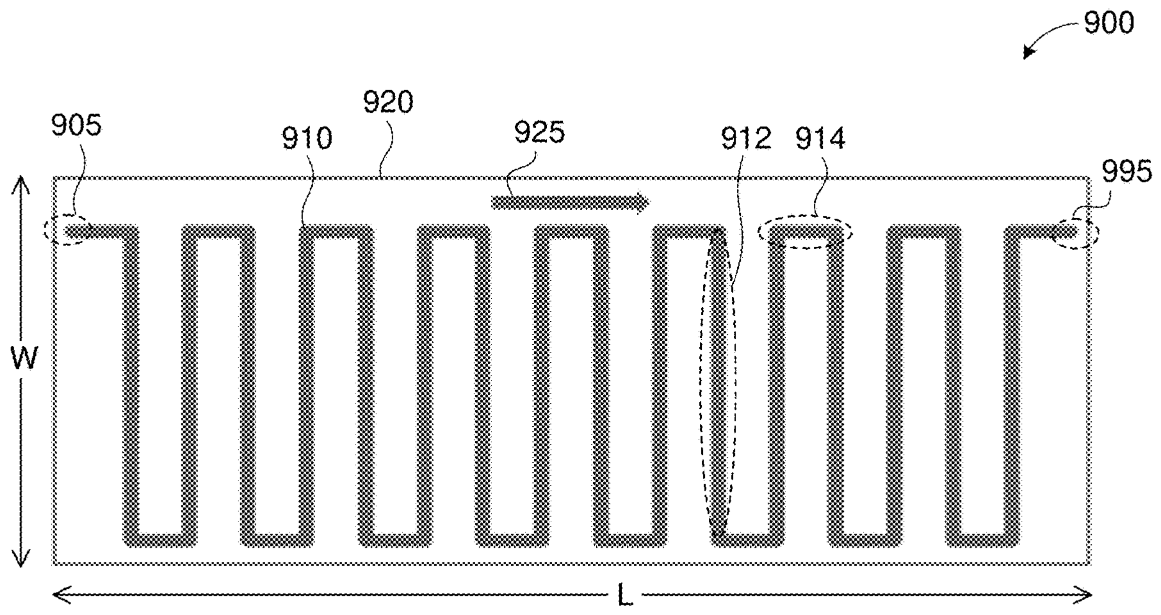
FIG. 9 is a plan view of a conventional layout of a serpentine ion transport channel.

FIG. 9 is a plan view 900 of a conventional layout of a serpentine ion transport channel. Ion transport channel 910 is shown laid out on substrate 920. Channel 910 is shown having entrance port 905 and exit port 995, with ions guided e.g. by a traveling wave along channel 910 in the general direction shown by arrow 925. Such a layout is dubbed a "serpentine" layout, incorporating a series of major segments 912 spanning the width W of substrate 920, with successive major segments joined by short bends 914. There are 15 bend sections and 32 right angle turns in total. Such a configuration has been used in SLIM layouts and has an advantage in wiring accessibility: no leads have to travel more than w/2 in the electrode plane to escape to the substrate periphery. However, the number of bends is proportional to the length L of the substrate.

FIG. 10 is a plan view 1000 of an example layout of a serpentine ion transport channel 1010 according to the disclosed technologies. Channel 1010 is shown having entrance port 1005 and exit port 1095, with ions guided e.g. by a traveling wave along channel 1010. Major segments, such as 1012, 1016, span the length L of substrate 1020, with successive major segments joined by short bend segments 1014. Arrow 1025 shows a direction of propagation of traveling waves and ions in half the major segments including segment 1012. This configuration has six bend sections and 12 right angle turns in total. Although wiring in the electrode plane has longer to travel to escape to the periphery of the substrate, the total number of bends is proportional to W rather than L, and the number of bends can be considerably reduced compared to the layout of FIG. 9.

As described herein, the presence of bends has been found to have deleterious effects on ion transport performance, including resolving power. Hence, the reduction in number of bends in FIG. 10 can provide improved resolving power, for a given total ion channel length, as compared to the layout of FIG. 9.

Performance Examples

FIG. 11 is a chart sequence illustrating ion flow simulations over a portion of the ion transport channel of FIG. 2, for varying electrode phasings, according to the disclosed technologies. Insets 1110-1170 show a superposition of 1000 single-ion trajectory simulations through a transport channel similar to that of FIGS. 2-4. Each trajectory goes from top-left to top-right along a first segment (similar to 210), continuing to bottom-right along a second bend segment (220), and thence toward the bottom left along third segment (230). Some rendering artifacts are also visible in insets 1110-1170. Each inset 1110-1170 is also labeled with a phasing angle ΔΦ, relative to a baseline configuration, of traveling wave phase in the second segment relative to traveling wave phase in the first segment. As discussed in context of FIG. 5, negative values of ΔΦ indicate retardation and positive values indicate phase advance. In each simulation run, this amount of retardation is duplicated going from second segment to third segment of the ion transport channel. Thus, inset 1130, labeled −90°, corresponds to a traveling wave configuration similar to FIG. 4, and inset 1110, labeled 0°, corresponds to a conventional traveling wave configuration similar to FIG. 3. Only seven insets are shown. The 180° case was found to have unacceptably high ion losses and was rejected from this study.

Some differences in behavior can be seen at the transitions between segments. For example, insets 1120, 1130 have well behaved trajectories following the corners entering and exiting the second (bend) segment. In contrast, insets 1140-1170 each have noticeable distortion in the trajectories, with many simulated ions having excursions either to the outside of a corner or inside of the corner.

FIG. 12 is a chart sequence illustrating ion transit time distributions corresponding to the simulations and electrode phasings of FIG. 11. Each inset 1210-1270 shows a histogram of transit times for the respective 1000 simulated single-ion trajectories, and is labeled with a phasing angle ΔΦ in a range −180° to 180°, corresponding to the labels of FIG. 11, indicating phase retardation (or advancement) of a second or third segment relative to the preceding segment. Each inset is also labeled with a mean and standard deviation of the respective histogram. So while the baseline histogram of inset 1210 has mean transit time of 12.9 ms, the transit time for insets 1220, 1230 is only 12.1 ms. This 6.4% reduction in transit time demonstrates smoother trajectories and more efficient coupling compared to the baseline configuration and the other insets. In comparison, the increased transit times of insets 1240-1270 are evidence of inefficient coupling and wobbly trajectories, as also seen in the corner excursions of FIG. 11. The unexpected superior performance of 45° and 90° retardations can lead to improved instrument performance as compared to a baseline configuration.

Example Separation Using Combined Modalities

Figure 13:
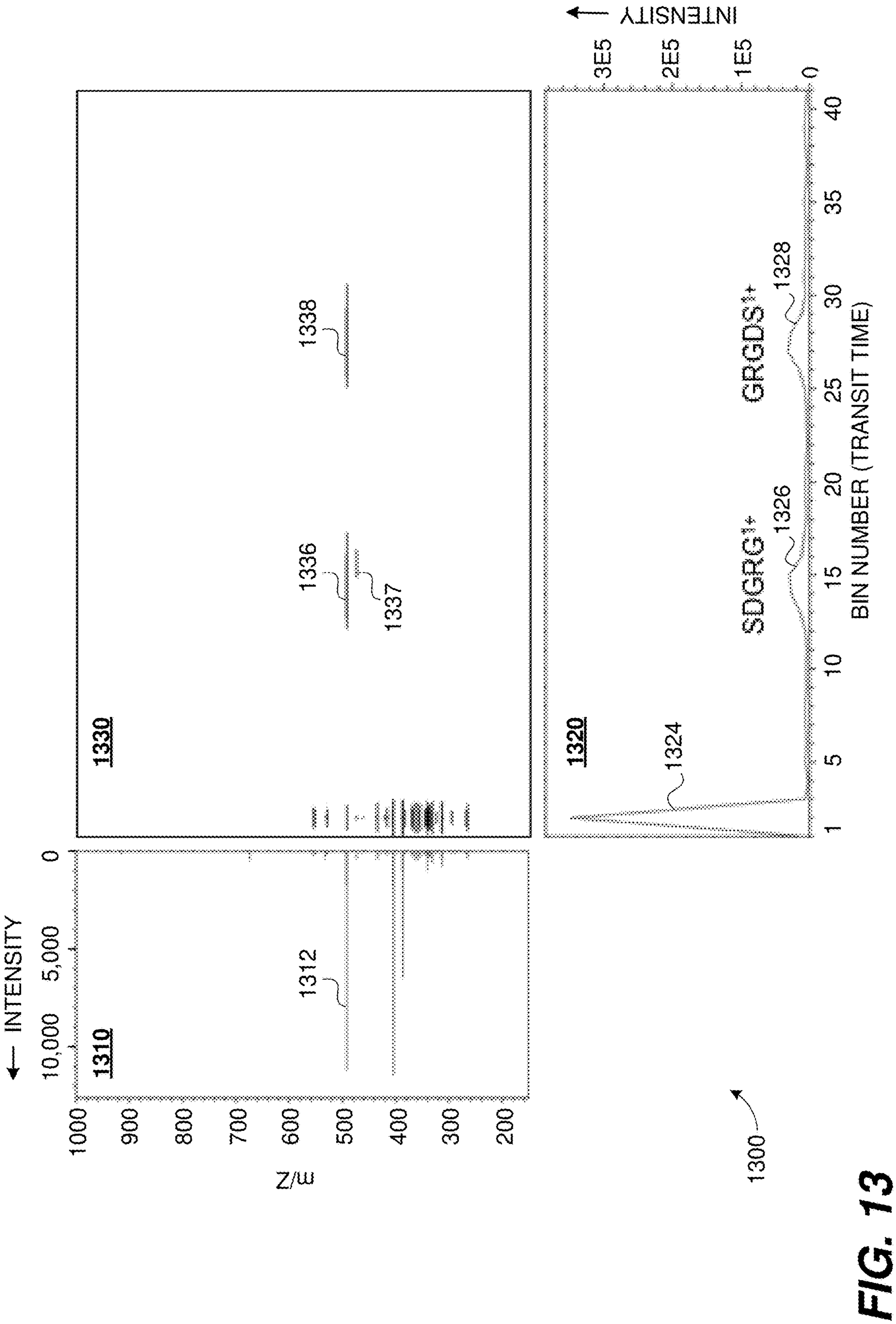
FIG. 13 is a chart illustrating an example of species identification using a combination of separation modalities according to the disclosed technologies.

FIG. 13 is a compound chart 1300 illustrating an example of species identification using a combination of separation modalities. Three charts 1310, 1320, 1330 are shown and described below. In this illustration, two peptide isomers can be distinguished and positively identified. Peptides SDGRG and GRGDS are isomers, each comprising the same five amino acids, but in opposite sequence. These amino acids are serine (Ser or S), aspartic acid (Asp or D), glycine (Gly or G), arginine (Arg or R), and another glycine.

Modern mass spectrometers can offer millidalton mass resolution, allowing species to be distinguished based on molecular formula even if their nominal weights are the same. To illustrate, carbon monoxide (CO) and nitrogen (N2) each have nominal molecular weight 28. However, the exact atomic weights of C, N, and O deviate slightly from their nominal values 12, 14, 16, as a result of which the molecular weights of CO and N2 are 28.010 and 28.013 daltons respectively. This small difference can be distinguished by some mass spectrometers.

However, in the case of isomers such as SDGRG and GRGDS, the molecular formulae are identical and even a high-resolution MS can fail to distinguish these isomers. Chart 1310 depicts a mass spectrum of a sample containing a mixture of SDGRG, GRGDS, and other components. Chart 1310 is presented in rotated layout, so that the vertical axis represents the ratio of mass to ionic charge (m/Z), while intensity of the spectrum (in arbitrary units) is shown along a horizontal axis. Singly ionized SDGRG and GRGDS are both included within peak 1312 at m/Z=490.5.

IM separation can separate ions based on their collision cross section with a buffer gas. Because SDGRG and GRGDS have different shapes and different collision cross-sections, they can be readily distinguished in an IM spectrum. Chart 1320 depicts an IM spectrum of the same mixture analyzed in chart 1310. Chart 1320 shows three peaks: peak 1324 aggregating various high-mobility species having low collision cross-sections, peak 1326 indicating peptide $SDGRG^{1+}$ and peak 1328 indicating peptide $GRGDS^{1+}$. Chart 1320 shows ion transit time (quantized according to bins in which separated ions can be collected) along the horizontal axis, and intensity (in arbitrary units) along the vertical axis. Peaks 1326, 1328 are well resolved, having a separation several times the width of either peak.

An IM spectrum can be sufficient to make quantitative measurements on known species, but may not be able to positively identify unknown species.

Chart 1330 shows a two-dimensional spectrum combining IM separation, e.g. performed by a SLIM such as 120 of FIG. 1, with an Orbitrap MS such as 140. In chart 1330, ion mobility bins are along the horizontal axis, and mass-charge ratio (m/Z) is along the vertical axis. Peaks 1336, 1338 appear in the same ion mobility bins as peaks 1326, 1328 of chart 1320. Moreover, the precise mass 490.5 of these species allows the peaks to be positively identified as peptides SDGRG and GRGDS.

Also shown in chart 1330 is a minor peak 1337, which has m/Z approximately 470 and is not SDGRG, but which was not distinguishable from SDGRG in the single-modality IM spectrum 1320.

Example Electrode Waveforms

Figure 14:
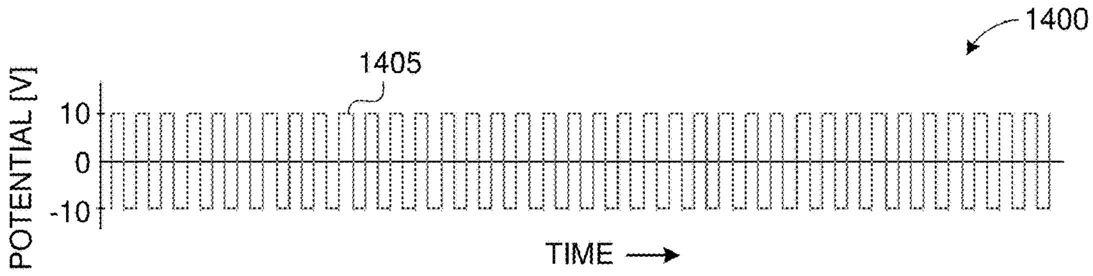
FIG. 14 is a chart illustrating an example electrode waveform conventionally used in ion mobility separation.

FIG. 14 is a chart 1400 illustrating an example electrode waveform conventionally used in IM separation. Electric potential in volts is shown along the vertical axis, and time runs along the horizontal axis. As illustrated, a continuous square wave excitation 1405 is applied to an instant electrode. Together with similar waveforms, suitably phased, applied to successive electrodes along a path, waveform 1405 can generate a traveling wave in an ion transport channel. In the presence of a buffer gas, different ion species can have different mobilities along the traveling wave, and can be separated accordingly.

Figure 15:
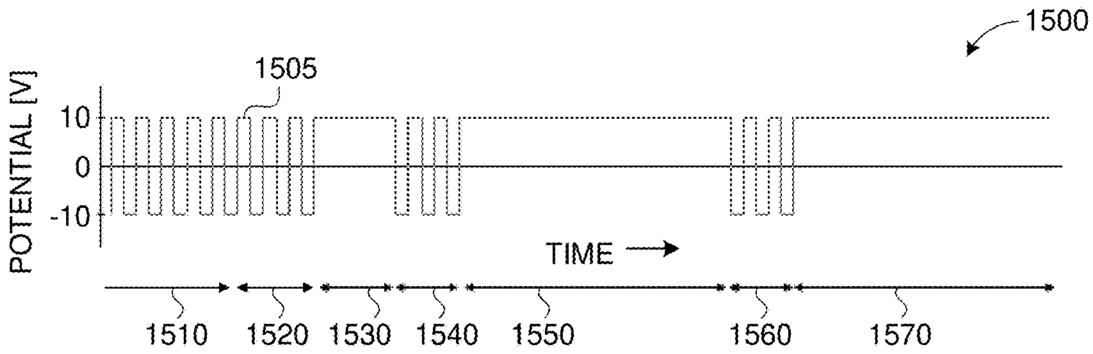
FIG. 15 is a chart illustrating an electrode waveform used in examples of the disclosed technologies.

FIG. 15 is a chart 1500 illustrating an electrode waveform used in some innovative examples. Electric potential in volts is shown along the vertical axis, and time runs along the horizontal axis. As illustrated, an irregular waveform 1505 is applied to an instant electrode. Waveform 1505 can be applied to an electrode in an IM separation subsystem similar to 810 of FIG. 8 or 120 of FIG. 1. This subsystem can receive ions from an ion source (805) and can provide ions to receiver (815) which can be a downstream analyzer such as an MS (140). Together with similar waveforms, suitably phased, applied to successive electrodes along a path, waveform 1505 can generate a traveling wave in controlled time intervals.

First Example Operation with Intermittent Traveling Waves

Operation of the IM separation subsystem under waveform 1505 is described with reference to the time intervals 1510-1570.

Initially, a pulse of ions can be introduced (808) into the subsystem (810) from the ion source (805). During interval 1510, the ions traverse the subsystem. Under the combined influences of traveling wave electric fields and collisions with a buffer gas, the ions exhibit varying mobilities and can be separated accordingly.

In varying examples, interval 1510 can encompass a single transit through the subsystem, or recirculation through a switchable recirculation path (similar to 126) to increase the effective length of the IM separation subsystem.

Eventually, some ions reach an exit (127) of the subsystem. During interval 1520, traveling wave excitation can continue and an initial packet of ions can be discharged (812) to a downstream analyzer. To avoid loss of sample ions while the downstream analyzer is busy processing the initial packet of ions, electrode excitations can be frozen during interval 1530. Thus, the traveling wave of interval 1520 can become a stationary wave during interval 1530. In examples, this halts both transport and separation of ions in the IM analyzer (810). Ions remaining in the IM analyzer can be at various stages of their transit. Some ions with low collision cross-sections can be near the exit, just needing a few more periods of traveling wave excitation to be discharged, while other low mobility ions can have completed half or even less of their transit, awaiting further separation.

At the end of interval 1530, the downstream analyzer can be ready for another packet of ions, having completed analysis of the initial ion packet. Then, in interval 1540, the traveling wave excitation can be resumed. A next packet of ions can be discharged, and the other ions remaining in the IM analyzer can be advanced along the ion transport channel, undergoing some more separation in the process. The cycle 1530-1540 can be repeated. Waveforms can be held stationary during intervals 1550, 1570 while the downstream analyzer is busy, and traveling and separation can be resumed in interval 1560 when the downstream analyzer is ready to accept another ion packet.

Eventually, all ions of interest can be separated and delivered to the downstream analyzer. In some examples, the traveling wave can then be run continuously to flush all ions from the subsystem while, in other examples, electrode voltages can simply be turned off. In further examples, another pulse of ions can be injected (808) into the subsystem, and the entire process can be repeated.

Second Example Operation with Intermittent Traveling Waves

Figure 17:
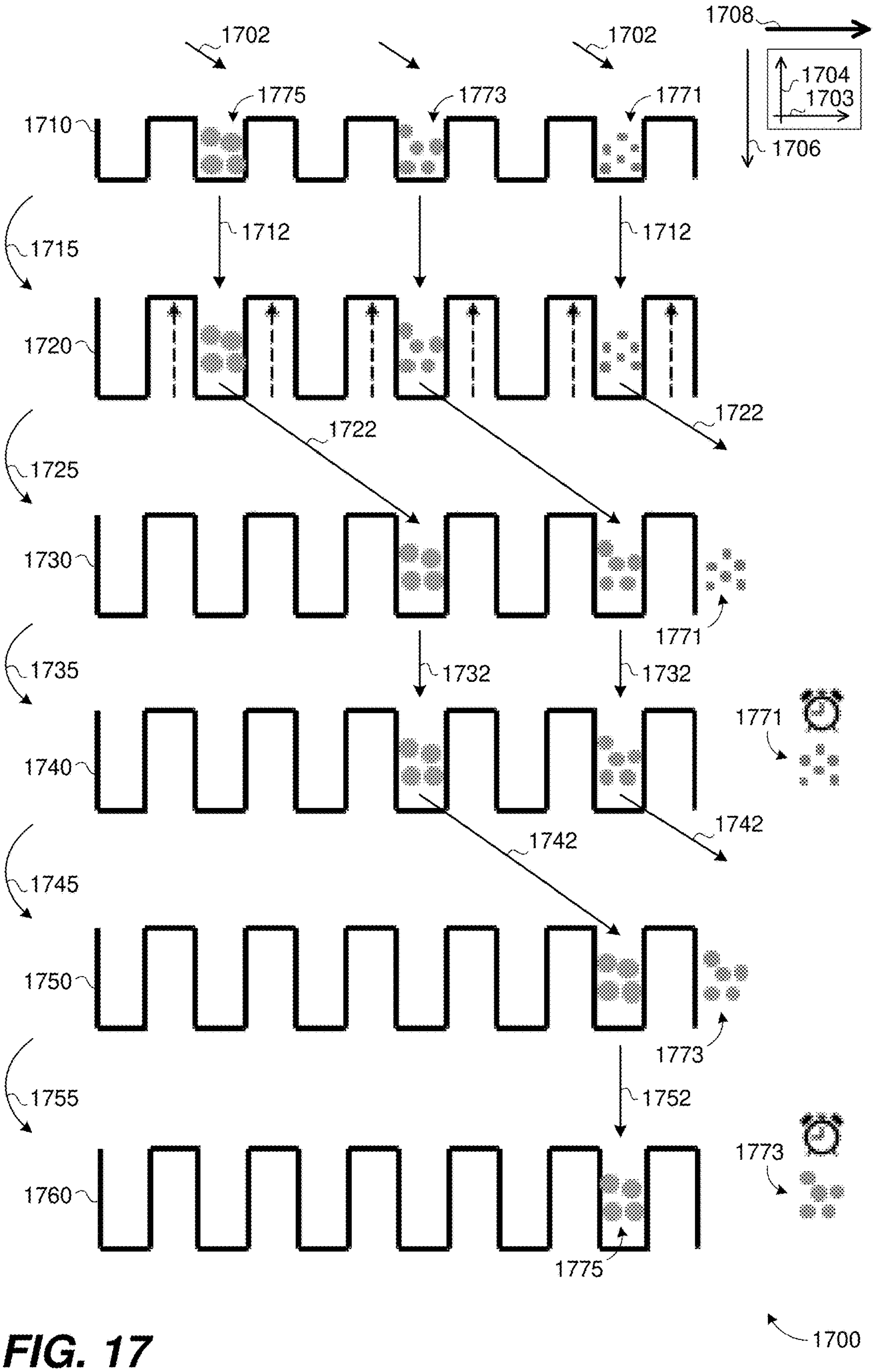
FIG. 17 is a diagram showing temporal evolution of ions according to an example of the disclosed technologies.

FIG. 17 is a diagram 1700 showing temporal evolution of ions according to an example of the disclosed technologies. FIG. 17 shows a spatial variation of electrode voltage along an ion transport channel in multiple waveform snapshots 1710-1760. Arrows in the top right of FIG. 17 explain the organization of the snapshots: successive snapshots are ordered with time increasing downward as shown by arrow 1706. Within each snapshot, vertical axis 1704 represents electrode voltage and horizontal axis 1703 represents a spatial coordinate along the ion transport channel. Moreover, spatial waveforms 1710-1760 are snapshots of an intermittent traveling wave with direction of propagation from left to right as shown by arrow 1708. Between successive snapshots 1710-1760, transition time intervals are indicated by curved arrows 1715-1755.

Each snapshot 1710-1760 depicts spatial variation across multiple electrodes at respective points in time, as compared to waveform 1505 of FIG. 15 which depicts temporal evolution of one electrode's voltage.

In FIG. 17, arrows 1702 represent ions being transported by traveling waves. Notably, a population of particles 1771 with low collision cross-section can exhibit high mobility and can propagate farther through the ion transport channel, leaving behind particle populations 1773, 1775 which have progressively larger collision cross-section and lower mobility. Thus, in first waveform snapshot 1710, populations 1771, 1773, 1775 are shown separated in respective buckets formed by waveform 1710.

Transition interval 1715 can be a passive interval, and the electrode waveform can be held stationary, although the amplitude of the waveform can be increased as shown. Accordingly, ions 1771, 1773, 1775 in snapshot 1720 remain in the same positions as in snapshot 1710, as indicated by arrows 1712.

Transition interval 1725 can be an active interval, and the electrode waveform can resume traveling, with ions 1771, 1773, 1775 advancing to snapshot 1730 as shown by arrows 1722. In particular, mobile ions 1771 can be discharged at an output of the ion separation channel.

During passive transition interval 1735, the electrode waveform can again be held stationary. Ion packet 1771 can be analyzed by downstream analyzer (140, 1780) during this interval. Ions 1773, 1775 in snapshot 1740 remain in their positions as shown by arrows 1732.

During active transition interval 1745, the electrode waveform can resume traveling and ions 1773, 1775 can advance to snapshot 1750 as shown by arrows 1742. In particular, mobile ions 1773 can be discharged at an output of the ion separation channel.

During passive transition interval 1755, the electrode waveform can be held stationary. Ion packet 1773 can be analyzed by downstream analyzer (140, 1780) during this interval. Ions 1775 in snapshot 1760 remain in their positions as shown by arrows 1752.

The alternating sequence of active and passive intervals can be continued until all ions packets of interest have been discharged to a downstream analyzer.

Second Example Method

Figure 16:
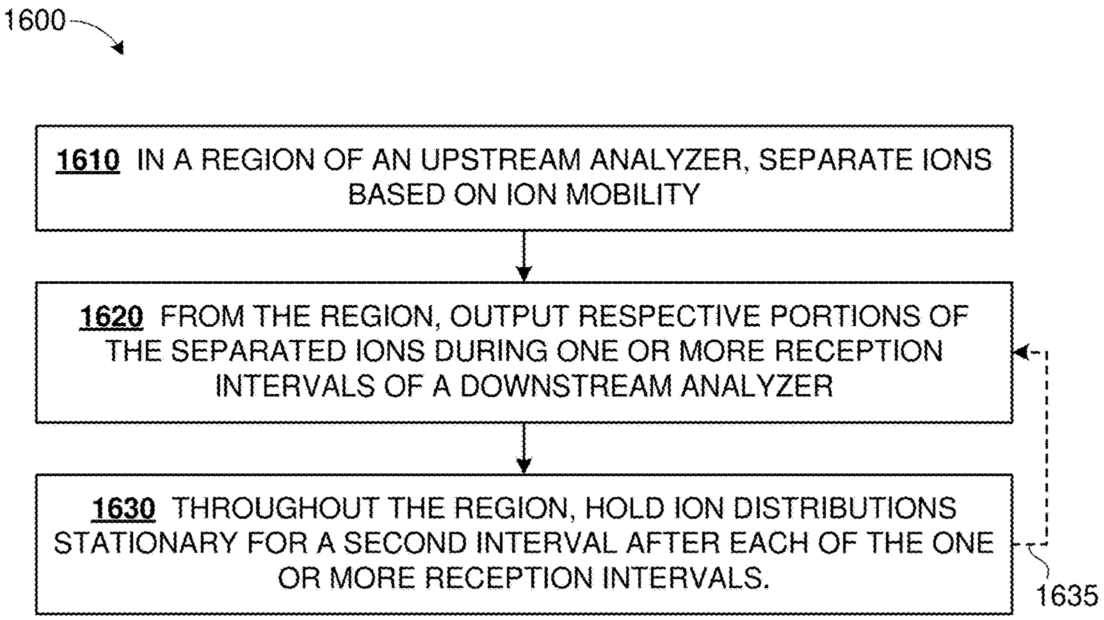
FIG. 16 is a flowchart of a second example method according to the disclosed technologies.

FIG. 16 is a flowchart 1600 of a second example method. In this method, ions are intermittently outputted to a downstream analyzer. This method can be performed using equipment or electrode waveforms similar to that described in context of FIGS. 1, 7, 8, 15, or elsewhere herein.

At process block 1610, ions can be separated based on ion mobility in a region of an upstream analyzer. This action can be performed during intervals similar to 1510, 1520, 1540, or 1560 of FIG. 15. At process block 1620, respective portions of the separated ions can be outputted during one or more reception intervals of a downstream analyzer. This action can be performed during intervals similar to 1520, 1540, or 1560. Then, at process block 1630, ion distributions can be held stationary, throughout the region of the upstream analyzer, for a second interval after each of the reception intervals. This action can be performed during intervals similar to 1530, 1550, or 1570.

Numerous variations and extensions of this method can be implemented within the scope of disclosed technologies. In examples, voltage waveforms can be applied to electrodes defining an ion transport channel in the region, thereby performing the separating, outputting, or holding. In particular, the separating and outputting can be performed using a traveling wave excitation to the electrodes as described herein, while the holding can be performed using a stationary waveform. That is, spatial oscillations of the electrode excitations can define buckets, along the ion transport channel, within which respective groups of ions can be held during the second interval. The outputting and holding actions can be repeated in an alternating sequence, as indicated by optional path 1635 from block 1630 back to block 1620.

In examples, the downstream analyzer can be an MS. The outputted ions can be introduced into the downstream analyzer. The ions can be received from a biological sample.

In further examples, a duration of the second interval can be determined based on an amount of time required by the downstream analyzer to perform analysis on a previously outputted portion of the separated ions.

The second method can be combined with collisional dissociation, e.g. in a high-energy collisional dissociation cell. In some examples, precursor ions can be obtained from a sample and can be collisionally dissociated to obtain fragment ions. The separating, outputting, and holding actions can be performed on the fragment ions. In other examples, collisional dissociation can be performed on one or more portions of the outputted ions to obtain fragments, and the downstream analyzer can perform mass spectroscopy or other analysis on these fragments.

Example Apparatus

Figure 18:
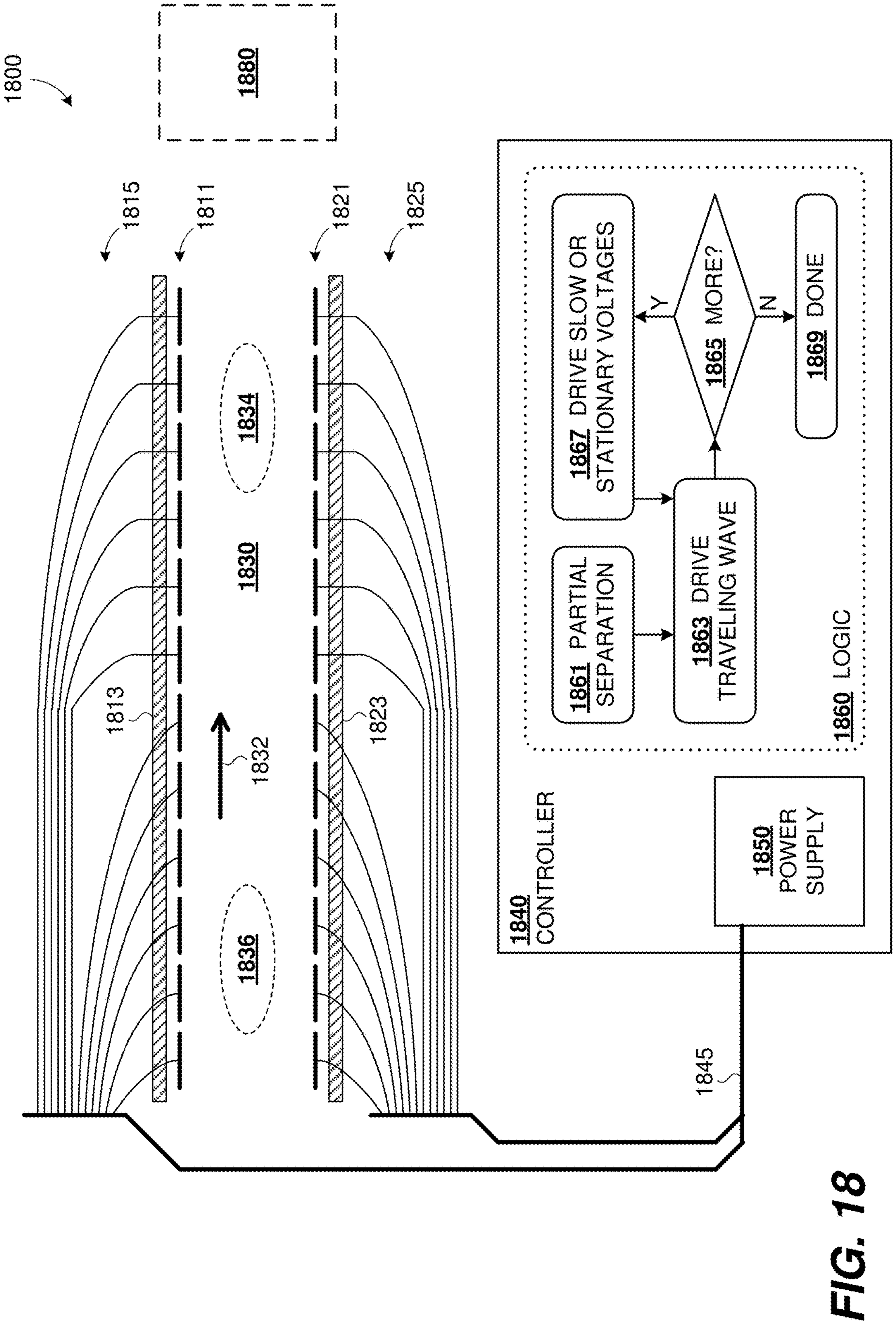
FIG. 18 is a diagram of an example apparatus with which disclosed technologies can be implemented.

FIG. 18 is a diagram of an example apparatus 1800 which can implement disclosed technologies. In FIG. 18, a controller is coupled to provide intermittent traveling waves in an ion transport channel.

Electrodes 1811, 1821 can be mounted on substrates 1813, 1823, and can define ion transport channel 1830. Controller 1840 can be coupled to control voltages on electrodes 1811, 1821 in alternating active and passive time intervals. To illustrate, controller 1840 can include a power supply 1850 which can be coupled to electrodes 1811, 1821 via wiring 1845, 1815, 1825. Controller 1840 can also implement logic 1860, e.g. through a combination of hardware and software, according to which power supply 1850 can be controlled to provide innovative excitations on electrodes 1811, 1821 over the active and passive time intervals.

During the active intervals, controller 1840 can be configured to drive one or more traveling waves (e.g. propagating in a direction shown by arrow 1832) on electrodes 1811, 1821 as indicated by logic block 1863. The traveling waves 1832 can perform IM separation on ions 1834, 1836 in channel 1830 and deliver ions to downstream analyzer 1880. Analyzer 1880 may be part of the environment of apparatus 1800 rather than part of apparatus 1800 itself, and is shown in dashed outline accordingly.

During the passive intervals, controller 1840 can be configured to control the voltages on electrodes 1811, 1821 to have a lower propagation speed than traveling wave 1832, as indicated by logic block 1867. To illustrate, a voltage pattern on electrodes 1811, 1821 can be held stationary during a passive interval.

Numerous variations and extensions of apparatus 1800 can be implemented within the scope of disclosed technologies. In some examples, the controlled voltages during the passive interval can have greater peak-to-peak variation than traveling waves 1832. For better separation of ions, ion transport channel 1830 can be extended in length, e.g. in the form of a serpentine path, as shown in FIG. 1, 9, or 10; or with multiple stacked levels and ion elevators between successive levels; or with a switchable recirculation path (126).

The operation of logic 1860 can be described in context of FIGS. 15-16. At logic block 1861, initial separation of ions can be performed, similar to that described in context of interval 1510 or block 1610. At logic block 1863, a traveling wave can be driven on electrodes 1811, 1821, similar to the description of interval 1520 or block 1620. At decision block 1865, a determination can be made whether any further ions should be discharged to downstream analyzer 1880. If yes, logic 1860 can proceed via Y branch to logic block 1867 where slow-moving or stationary voltages can be applied to electrodes 1811, 1821, similar to the description of interval 1530 or block 1630. Thereafter, the logic can continue iterating over blocks 1863, 1867 (intervals 1540-1570 or loop path 1635) until all ions of interest have been discharged, at which point logic 1860 can terminate via the N branch from block 1865 to 1869.

Downstream analyzer 1880 can be a mass spectrometer, such as an Orbitrap MS, a Fourier Transform Ion Cyclotron Resonance (FT-ICR) MS, or Time of Flight (TOF) MS. In additional examples, disclosed technologies can be implemented as a system, including apparatus 1800 and downstream analyzer 1880. In further examples, apparatus 1800 can be combined with a high-energy collision-induced dissociation (HE-CID) cell, to perform separations on ion fragments in downstream analyzer 1880 or in both apparatus 1800 and downstream analyzer 1880. Still further, apparatus 1800 can be combined with a compression cell or a reaction chamber.

The duration of a passive interval can be based on a time duration T2 of analysis performed by downstream analyzer 1880. In this way, active intervals can be synchronized to provide ions to downstream analyzer 1880 only when downstream analyzer 1880 is ready to accept another packet of ions. The time duration T2 of downstream analysis, or the time duration of a passive interval, can be in a range 10 ms to 100 s, or 3 s to 100 s.

The time span T1 from injection of ions into apparatus 1800 to an initial delivery of separated ions to downstream analyzer 1880 (similar to 1510 of FIG. 15) can be in a range commonly 10 ms to 20 s, or preferably 400 ms to 3 s. This time span can correspond to transit of high mobility ions through ion transport channel 1830; lower mobility ions can have longer transit times.

Additional Performance Examples

Comparing performance with and without passive intervals, two regimes can be considered. In one regime, T1<T2 and sample ions can be conserved within apparatus 1800 during the passive intervals. The passive intervals can improve utilization of sample material, although total time for sample analysis can be similar to that without the passive intervals.

In another regime, T1>T2. In this regime, the use of passive intervals allows initial separation 1510 to be performed only once, and the time interval 1530 between downstream analyses can be T2. Without passive intervals, initial separation 1510 can be repeated for each downstream analysis, with the result that successive outputs to a downstream analyzer can be separated by at least T1. Because T2<T1 in this regime, incorporation of passive intervals can reduce the total time for sample analysis. In this regime, sample material is also conserved.

Figure 19:
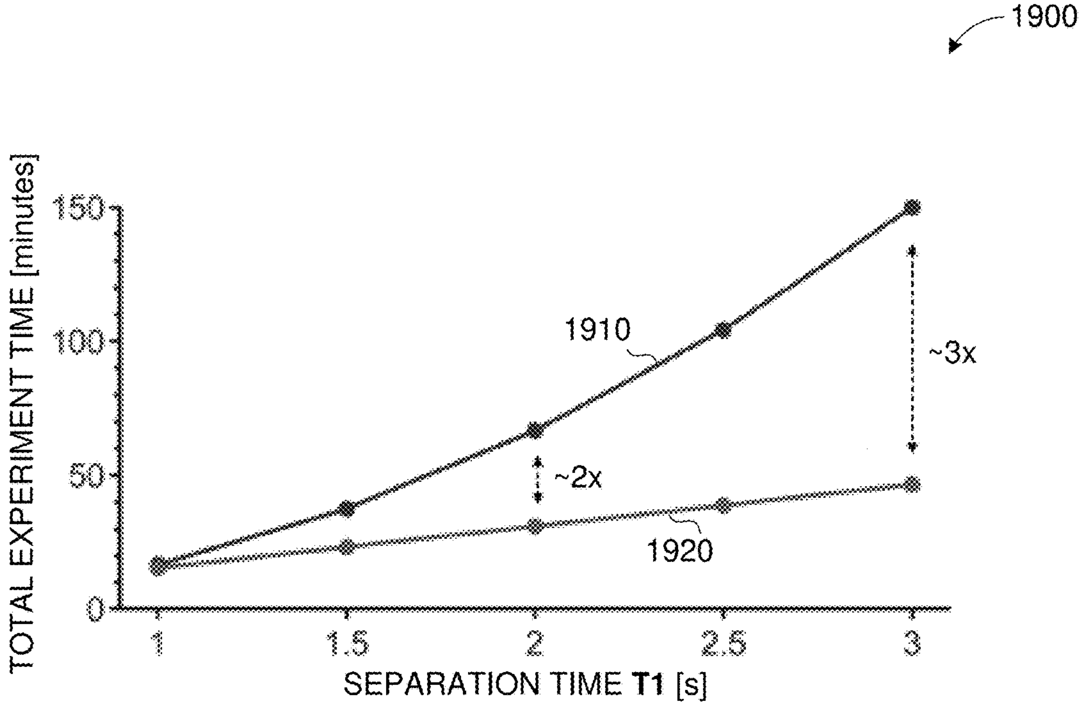
FIG. 19 is a chart illustrating performance for some examples of the disclosed technologies.

FIG. 19 is a chart 1900 illustrating performance of an innovative system for the regime T1>T2. In this illustration, an IM separation apparatus similar to 1800 is coupled to a downstream MS having a cycle time of 1 s. Approximately 1000 packets of mobility-separated ions are analyzed by downstream analyzer 1880. Line 1910 shows the total time required as a function of separation time T1 with continuous traveling wave (e.g. no passive intervals), while line 1920 shows the total time required with alternating active and passive intervals as described herein.

Starting at the left, with T1=1 s, an initial separation takes 1 s, and a new downstream analysis can be commenced every 1 s. Without passive intervals, the IM separation apparatus can perform a next separation while a previous ion packet is being analyzed downstream. With passive intervals, the IM separation apparatus can hold ion distributions stationary while ions are being analyzed downstream. In either case, the total time taken is 1 s (for the initial separation)+(1000×1 s) (for downstream analyses)=1001 s. As illustrated, lines 1910, 1920 intersect at T1=1 s.

For T1>1 s, lines 1910, 1920 diverge. At T1=2 s (2×T2), the alternating active/passive intervals provides a speedup by about a factor of two, while at T1=3 s, a speedup of about a factor of 3 can be achieved.

Further Examples with Phase Controlled Waveforms

The following are further examples of the disclosed technologies.

Example 1 is an apparatus, including: a first set of electrodes configured to generate a first traveling wave to direct ions along a path in a first direction toward an intersection with another path or bend; and a second set of electrodes configured to generate a second traveling wave to direct the ions in a second direction along the another path or bend, the second direction differing from the first direction; wherein a phase of the second traveling wave relative to the first traveling wave is selected to control one or more properties of the directed ions.

Example 2 includes the subject matter of Example 1, and further specifies that the second direction has a physical orientation between 45° and 135° relative to the first direction.

Example 3 includes the subject matter of any of Examples 1-2, and further specifies that: a longitudinal extent of the first set of electrodes exceeds an extent of the second set of electrodes along the bend; the longitudinal extent of the first set of electrodes is greater than two periods of the first traveling wave; and the extent of the second set of electrodes along the bend is less than three periods of the second traveling wave.

Example 4 includes the subject matter of any of Examples 1-3, and further specifies that the phase is selected to optimize the one or more properties, which comprise: ion transit time, resolving power, ion loss, or width of transit time distribution.

Example 5 includes the subject matter of any of Examples 1-4, and further specifies that the one or more properties are two or more properties, and the phase is selected to optimize a figure of merit dependent on all of the two or more properties.

Example 6 includes the subject matter of any of Examples 1-5, and further specifies that the first traveling wave has a periodicity of length L, wherein a baseline configuration maintains the periodicity across a transition from the first set of electrodes to the second set of electrodes, and wherein the selected phase is: advanced relative to the baseline configuration; advanced relative to the baseline configuration by a phase shift in a range [10°, 120°]; retarded relative to the baseline configuration; or advanced or retarded relative to the baseline configuration by a phase shift in a range [5°, 175°], [10°, 170°], [π/8, 3π/8], [3π/8, 5π/8], or [5π/8, 7π/8], for any number of electrodes constituting one period of the traveling wave. The notation [A, B] denotes a closed interval bounded by A and B.

Example 7 includes the subject matter of any of Examples 1-6, and further includes: a third set of electrodes configured to generate a third traveling wave to direct the ions in a third direction away from the bend, the third direction differing from the second direction; wherein the first traveling wave has a periodicity of length L, wherein a first baseline configuration maintains the periodicity across a first transition from the first set of electrodes to the second set of electrodes, wherein the phase of the second traveling wave is advanced relative to the first baseline configuration by a first phase shift in a range [10°, 120°]; wherein a second baseline configuration maintains a periodicity of the second traveling wave across a second transition from the second set of electrodes to the third set of electrodes; and wherein a phase of the third traveling wave is advanced relative to the second baseline configuration by a second phase shift in a range [10°, 120°]; or wherein a traveling wave excitation applied to the third set of electrodes is advanced or retarded relative to the baseline configuration by a second phase shift in a range [5°, 175°], [10°, 170°], [π/8, 3π/8], [3π/8, 5π/8], or [5π/8, 7π/8], and wherein the second phase shift is greater than, equal to, or less than the first phase shift.

Example 8 includes the subject matter of Example 7, and further specifies that a traveling wave excitation applied to the second set of electrodes has a periodicity of N electrodes, the second set of electrodes has a longitudinal extent of M electrodes along the second direction, wherein N≤M≤3×N.

Example 9 includes the subject matter of any of Examples 1-8, and further specifies that a traveling wave excitation applied to the first set of electrodes, the second set of electrodes, or the third set of electrodes has a periodicity of N electrodes, wherein N is in a range 4 to Example 16.

Example 10 is an ion-manipulation subsystem, including: the apparatus of claim 1; two facing substrates on which the first and second sets of electrodes are affixed to form an ion transport channel between the substrates; a frame within which the substrates are fixedly mounted; one or more electrical connectors coupled to the first and second sets of electrodes and configured to convey electrical signals to the first and second sets of electrodes to develop the first and second traveling waves.

Example 11 includes the subject matter of Example 10, and further specifies that the ion transport channel comprises: a plurality of major segments, including a first segment defined by the first set of electrodes; and a plurality of bend segments, including a first bend segment defined by the second set of electrodes, each bend segment coupling a respective pair of the major segments.

Example 12 includes the subject matter of any of Examples 10-11, and further specifies that: the ion-manipulation subsystem achieves a resolving power greater than Example 500.

Example 13 includes the subject matter of any of Examples 10-12, and further specifies that the ion transport channel comprises a switchable recirculation path.

Example 14 is an ion-manipulation system, including: an ion injector; an ion receiver; the ion-manipulation subsystem of any one of Examples 10-13, coupled between the ion injector and the ion receiver; and a multiphase power supply coupled to the one or more electrical connectors and configured to provide the electrical signals to the ion-manipulation subsystem to develop the first and second traveling waves.

Example 15 includes the subject matter of Example 14, and further includes: a mass spectrometer coupled to receive ions from the ion receiver, wherein, during IM separation, the first traveling wave is iteratively stopped then restarted.

Example 16 is a method, including: generating, with a first set of electrodes, a first traveling wave along a path; directing ions, with the first traveling wave, in a first direction along the path, toward an intersection with another path or bend; generating, with a second set of electrodes, a second traveling wave along the another path or bend, wherein a phase of the second traveling wave relative to the first traveling wave is selected to control one or more properties of the directed ions; and directing the ions, with the second traveling wave, in a second direction along the another path or bend, the second direction differing from the first direction.

Example 17 includes the subject matter of Example 16, and further includes: generating, with a third set of electrodes, a third traveling wave along a further path, wherein a phase of the third traveling wave relative to the second traveling wave is also selected to control the one or more properties of the directed ions; and directing the ions, with the third traveling wave, in a third direction along the further path, the third direction differing from the second direction.

Example 18 includes the subject matter of any of Examples 16-17, and further specifies that the phase is selected to optimize the one or more properties, which comprise: ion transit time, resolving power, ion loss, or width of transit time distribution.

Example 19 is an ion-manipulation system, including: an ion injector; an ion receiver; an ion transport channel defined by a plurality of electrodes and coupled between the ion injector and the ion receiver, the ion transport channel comprising multiple segments including: a plurality of major segments; and a plurality of bend segments, each bend segment coupling a respective pair of the major segments; a multiphase power supply coupled to the electrodes and configured to develop respective traveling waves on the segments; wherein relative phases of the traveling waves on adjacent pairs of the segments are selected to optimize one or more of: ion transit time, resolving power, ion loss, or width of transit time distribution.

Example 20 includes the subject matter of Example 19, and further specifies that the ion-manipulation system achieves a resolving power greater than Example 250.

Example 21 includes the subject matter of any of Examples 1-15 above, combined with features of any of Examples 1-15 in the following section.

Example 22 includes the subject matter of any of Examples 16-18 above, combined with features of any of Examples 16-26 in the following section.

Further Examples with Temporally Controlled Waveforms

The following are still further examples of the disclosed technologies.

Example 1 is an apparatus, including: a set of electrodes defining an ion transport channel; and a controller coupled to control voltages on the electrodes in alternating active and passive intervals, the controller configured to: in the active intervals, drive one or more traveling waves on the electrodes to perform IM separation on ions in the ion transport channel and deliver the ions to a downstream analyzer; and in the passive intervals, maintain obtained separation and conserve the ions remaining in the ion transport channel by controlling the voltages to have a lower propagation speed than the traveling waves.

Example 2 includes the subject matter of Example 1, and further specifies that the controlled voltages are stationary during the passive intervals.

Example 3 includes the subject matter of any of Examples 1-2, and further specifies that the controlled voltages during the passive intervals have greater peak-to-peak amplitude variation than the traveling waves.

Example 4 includes the subject matter of any of Examples 1-3, and further specifies that a time period between successive active intervals is based on a time duration of analysis performed by the downstream analyzer.

Example 5 includes the subject matter of Example 4, and further specifies that the time duration is in a range 10 ms to 100 s, or 3 s to 100 s.

Example 6 includes the subject matter of any of Examples 1-5, and further specifies that a time span, from ingestion of ions into the apparatus to initial delivery of separated ions from the apparatus, is in a range 10 ms to 20 s, or 400 ms to 3 s.

Example 7 includes the subject matter of any of Examples 1-6, and further specifies that a time span, from ingestion of ions into the apparatus to initial delivery of separated ions from the apparatus, is less than a time duration of analysis performed by the downstream analyzer.

Example 8 includes the subject matter of any of Examples 1-7, and further specifies that a time span, from ingestion of ions into the apparatus to initial delivery of separated ions from the apparatus, is greater than a time duration of analysis performed by the downstream analyzer.

Example 9 includes the subject matter of any of Examples 1-8, and further specifies that the downstream analyzer is a mass spectrometer.

Example 10 includes the subject matter of Example 9, and further specifies that the mass spectrometer is: an Orbitrap mass spectrometer, a Fourier Transform Ion Cyclotron Resonance (FT-ICR) mass spectrometer, or a Time of Flight (TOF) mass spectrometer.

Example 11 is a system, including: the apparatus of any one of Examples 1-10, and the downstream analyzer.

Example 12 includes the subject matter of any of Examples 1-11, and further specifies that the ion transport channel comprises multiple levels.

Example 13 includes the subject matter of any of Examples 1-12, and further specifies that the ion transport channel comprises a switchable recirculation path.

Example 14 includes the subject matter of any of Examples 1-13, and further includes a high-energy collision-induced dissociation (HE-CID) cell.

Example 15 includes the subject matter of any of Examples 1-14, and further includes a compression cell.

Example 16 is a method, including: separating ions in a region of an upstream analyzer based on ion mobility; outputting, from the region, respective portions of the separated ions during one or more reception intervals of a downstream analyzer; and holding ion distributions stationary throughout the region of the upstream analyzer for a second interval after each of the one or more reception intervals.

Example 17 includes the subject matter of Example 16, and further includes: applying voltage waveforms to electrodes defining an ion transport channel in the region, to perform the separating, outputting, and holding.

Example 18 includes the subject matter of Example 17, and further specifies that the applied voltage waveforms comprise one or more traveling waves to perform the separating and the outputting.

Example 19 includes the subject matter of any of Examples 17-18, and further specifies that the applied voltage waveforms comprise one or more stationary waves to perform the holding.

Example 20 includes the subject matter of any of Examples 16-19, and further specifies that the downstream analyzer is a mass spectrometer.

Example 21 includes the subject matter of any of Examples 16-20, and further includes: introducing the outputted portions of the separated ions into the downstream analyzer.

Example 22 includes the subject matter of any of Examples 16-21, and further includes: determining the second interval based on time required by the downstream analyzer to perform analysis an a previously outputted portion of the separated ions.

Example 23 includes the subject matter of any of Examples 16-22, and further includes: repeating the outputting and the holding acts in an alternating sequence.

Example 24 includes the subject matter of any of Examples 16-23, and further includes: prior to the separating, receiving the ions from a biological sample.

Example 25 includes the subject matter of any of Examples 16-24, and further specifies that the ions comprise fragments, and the method further comprises: performing collisional dissociation on precursor ions to obtain the fragments.

Example 26 includes the subject matter of any of Examples 16-25, and further specifies that the method further comprises: performing collisional dissociation on the outputted portions of the ions to obtain fragments; and introducing the fragments into the downstream analyzer.

Example 27 includes the subject matter of any of Examples 1-15 above in this section, combined with features of any of Examples 1-15 or 19-22 in the preceding section.

Example 28 includes the subject matter of any of Examples 16-26 above in this section, combined with features of any of Examples 16-18 in the preceding section.

General Considerations

As used in this application and in the claims, the singular forms "a," "an," and "the" include the plural forms unless the context clearly dictates otherwise. Additionally, the term "includes" means "comprises." Further, the terms "coupled" or "attached" encompass mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatuses are referred to as "optimal," "lowest", "best", "minimum," or the like. Such terms are used to indicate that a selection among a few or among many alternatives can be made, and such selections need not be better, lower, less, or otherwise preferable to other alternatives not considered.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

In view of the many possible embodiments to which the principles of the disclosed technologies may be applied, it should be recognized that the illustrated embodiments are only preferred examples and should not be taken as limiting in scope. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus comprising:

an ion transport channel configured to transport ions along a continuous path following a plurality of directions of travel, the path comprising a plurality of major segments, including a first segment defined by a first set of electrodes, one or more bend segments, including a second segment defined by a second set of electrodes, and an intersection between the first and second segments;

the first set of electrodes, wherein electrodes within the first set, that are adjacent in a longitudinal first direction along the first segment, have distinct oscillatory electrical first signals applied in a first phased relationship, the first signals configured to generate a first traveling wave to direct the transported ions along the first segment in the first direction toward the intersection; and the second set of electrodes, wherein electrodes within the second set, that are adjacent in a longitudinal second direction along the second segment, have distinct oscillatory electrical second signals applied in a second phased relationship, the second signals configured to generate a second traveling wave to direct the transported ions along the second segment in the second direction, which differs from the first direction;

wherein the second traveling wave is configured to have an optimal phase relative to the first traveling wave, the optimal phase being selected to control one or more properties of the transported ions, the one or more properties comprising: transit time, width of a transit time distribution, resolving power, or ion loss.

2. The apparatus of claim 1, wherein the second direction has a physical orientation between 45° and 135° relative to the first direction.

3. The apparatus of claim 1, wherein:

a longitudinal extent of the first set of electrodes along the first segment exceeds a length of the second set of electrodes along the second segment;

a period of the first traveling wave is less than half the longitudinal extent of the first set of electrodes along the first segment; and a period of the second traveling wave is greater than one third the length of the second set of electrodes along the second segment.

4. The apparatus of claim 1, wherein the one or more properties are two or more properties, and the optimal phase is selected to optimize a figure of merit dependent on all of the two or more properties.

5. The apparatus of claim 1, wherein the first traveling wave has a spatial periodicity of length L, wherein a baseline configuration maintains the spatial periodicity across the intersection, and wherein the optimal phase is:

retarded relative to the baseline configuration by a phase shift in a range [10°, 120°].

6. The apparatus of claim 1, wherein:

the plurality of major segments further comprises a third segment defined by a third set of electrodes;

the intersection is a first intersection and the continuous path further comprises a second intersection between the second segment and the third segment;

the apparatus further comprises the third set of electrodes;

electrodes within the third set, that are adjacent in a longitudinal third direction along the third segment, have distinct oscillatory electrical third signals applied in a third phased relationship, the third signals configured to generate a third traveling wave to direct the transported ions along the third segment in a third direction away from the second intersection;

a first baseline configuration maintains spatial periodicity of the first traveling wave across the first intersection;

the phase of the second traveling wave is retarded relative to the first baseline configuration by a first phase shift in a range [10°, 120°];

a second baseline configuration maintains spatial periodicity of the second traveling wave across the second intersection; and a phase of the third traveling wave is retarded relative to the second baseline configuration by a second phase shift in a range [10°, 120°].

7. The apparatus of claim 6, wherein:

a cardinality of the second set of electrodes along the second segment is M; and the spatial periodicity of the second traveling wave, along the second direction, denoted in units of the electrodes of the second set, is at least M/3 and at most M.

8. The apparatus of claim 1, wherein the spatial periodicity of the first traveling wave is in a first range which is 4 to 16 electrodes of the first set of electrodes; or the spatial periodicity of the first traveling wave is in a second range which is 4 to 16 electrodes of the second set of electrodes.

9. An ion-manipulation subsystem comprising:

the apparatus of claim 1;

two facing substrates on which the first and second sets of electrodes are affixed to form the ion transport channel between the substrates;

a frame within which the substrates are fixedly mounted;

one or more electrical connectors coupled to the first and second sets of electrodes and configured to convey the electrical first signals and the electrical second signals to the first and second sets of electrodes to develop the first and second traveling waves respectively.

10. The ion-manipulation subsystem of claim 9, wherein the ion transport channel comprises:

a plurality of bend segments, including the second segment, each bend segment coupling a respective pair of the major segments.

11. The ion-manipulation subsystem of claim 9, wherein:

the ion-manipulation subsystem has a resolving power greater than 500.

12. The ion-manipulation subsystem of claim 9, wherein the ion transport channel comprises a switchable recirculation path.

13. An ion-manipulation system comprising:

an ion injector;

an ion receiver;

the ion-manipulation subsystem of claim 10, coupled between the ion injector and the ion receiver; and a multiphase power supply coupled to the one or more electrical connectors and configured to provide the electrical first signals and the electrical second signals to the ion-manipulation subsystem to develop the first and second traveling waves.

14. The ion-manipulation system of claim 13, further comprising:

a mass spectrometer coupled to receive ions from the ion receiver, wherein, during ion mobility separation, the first traveling wave is iteratively stopped then restarted.

15. A method comprising:

generating, with a first set of electrodes, a first traveling wave along a major segment of an ion transport channel;

directing ions, with the first traveling wave, in a first direction along the major segment, toward an intersection between the major segment and a bend segment of the ion transport channel;

generating, with a second set of electrodes, a second traveling wave along the bend segment; and directing the ions, with the second traveling wave, in a second direction along the bend segment, the second direction differing from the first direction;

wherein the improvement comprises:

selecting a phase of the second traveling wave relative to the first traveling wave to improve one or more properties of the directed ions.

16. The method of claim 15, further comprising:

generating, with a third set of electrodes, a third traveling wave along a further segment of the ion transport channel; and directing the ions, with the third traveling wave, in a third direction along the further segment, the third direction differing from the second direction;

wherein the improvement further comprises:

selecting a phase of the third traveling wave relative to the second traveling wave to further improve the one or more properties of the directed ions.

17. The method of claim 15, wherein the phase is selected to optimize the one or more properties, which comprise: ion transit time, resolving power, ion loss, or width of transit time distribution.

18. An ion-manipulation system comprising:

an ion injector;

an ion receiver;

an ion transport channel defined by a plurality of electrodes and coupled between the ion injector and the ion receiver, the ion transport channel comprising multiple segments including:

a plurality of major segments including a first segment and a third segment; and a plurality of bend segments, each bend segment coupling a respective pair of the major segments, the bend segments including a second segment coupling the first and third segments;

the electrodes;

a multiphase power supply coupled to apply oscillatory electrical signals to the electrodes to develop, on each of the segments, a respective traveling wave;

wherein relative phases of the traveling waves on adjacent pairs of the segments are selected to optimize one or more of:

ion transit time, resolving power, ion loss, or width of transit time distribution.

19. The ion-manipulation system of claim 18, wherein the ion-manipulation system has a resolving power greater than 250.

* * * * *